US008464304B2

(12) United States Patent  (10) Patent No.: US 8,464,304 B2
Harwell et al.  (45) Date of Patent: Jun. 11, 2013

(54) CONTENT CREATION AND DISTRIBUTION SYSTEM

(75) Inventors: Mark A. Harwell, Plano, TX (US); Christopher W. Wyatt, Dallas, TX (US); Ryland M. Reed, North Richland Hills, TX (US)

(73) Assignee: Youtoo Technologies, LLC, Las Colinas, TX (US)

( * ) Notice: Subject to any disclaimer, the term of this patent is extended or adjusted under 35 U.S.C. 154(b) by 0 days.

(21) Appl. No.: 13/185,471

(22) Filed: Jul. 18, 2011

(65) Prior Publication Data

US 2012/0192239 A1 Jul. 26, 2012

Related U.S. Application Data

(63) Continuation-in-part of application No. 13/013,775, filed on Jan. 25, 2011.

(51) Int. Cl.
*G06F 3/00* (2006.01)
*G06F 13/00* (2006.01)
*H04N 5/445* (2006.01)
*H04N 7/173* (2011.01)

(52) U.S. Cl.
USPC .............. 725/115; 725/37; 725/105; 725/114

(58) Field of Classification Search
USPC ......................................................... 725/37
See application file for complete search history.

(56) References Cited

U.S. PATENT DOCUMENTS

| | | | |
|---|---|---|---|
| 5,488,433 A | 1/1996 | Washino et al. | |
| 5,982,425 A * | 11/1999 | Allen et al. | 348/231.9 |
| 6,584,450 B1 | 6/2003 | Hastings et al. | |
| 6,697,103 B1 | 2/2004 | Fernandez et al. | |
| 6,757,482 B1 | 6/2004 | Ochiai et al. | |
| 6,774,926 B1 | 8/2004 | Ellis et al. | |
| 6,918,131 B1 | 7/2005 | Rautila et al. | |
| 7,562,300 B1 | 7/2009 | Tobias et al. | |
| 7,649,937 B2 | 1/2010 | Rabenold et al. | |
| 7,769,819 B2 | 8/2010 | Lerman et al. | |
| 7,904,490 B2 | 3/2011 | Ogikubo | |

(Continued)

OTHER PUBLICATIONS

Notification of Transmittal of the International Search Report and the Written Opinion of the International Searching Authority, or Declaration (1 page); International Search Report (2 pages); and Written Opinion of the International Searching Authority (8 pages), mailed Apr. 9, 2012, for related international application PCT/US2012/022355.

(Continued)

*Primary Examiner* — Justin Shepard
(74) *Attorney, Agent, or Firm* — Fish & Richardson P.C.

(57) ABSTRACT

Methods, systems, and apparatus, including computer programs encoded on a computer storage medium, for receiving and distributing user-generated video content. In one aspect, a method includes receiving video data from a client computing device, where the video data is captured using a camera connected to the client computing device in accordance with instructions executed on the client computing device to provide the video data in accordance with predetermined constraints. The video data is automatically transcoded into at least one different format based on user credentials associated with a user of the client computing device and/or attributes associated with the video data. At least one format of the transcoded video data defines a video file in a format appropriate for inclusion in a linear television programming transmission. The transcoded video data is uploaded to a server for distribution.

30 Claims, 22 Drawing Sheets

U.S. PATENT DOCUMENTS

| | | | |
|---|---|---|---|
| 8,051,447 B2 | 11/2011 | Stalling et al. | |
| 8,189,945 B2 * | 5/2012 | Stojancic et al. | 382/264 |
| 8,266,667 B2 | 9/2012 | O'Donnell et al. | |
| 8,311,382 B1 | 11/2012 | Harwell et al. | |
| 8,359,616 B2 | 1/2013 | Rosenberg et al. | |
| 2001/0004743 A1 | 6/2001 | Krueger et al. | |
| 2002/0056119 A1 | 5/2002 | Moynihan | |
| 2002/0104099 A1 | 8/2002 | Novak | |
| 2002/0112005 A1 | 8/2002 | Namias | |
| 2002/0120930 A1 | 8/2002 | Yona | |
| 2004/0008249 A1 | 1/2004 | Nelson et al. | |
| 2004/0078825 A1 | 4/2004 | Murphy | |
| 2004/0117786 A1 | 6/2004 | Kellerman et al. | |
| 2006/0074752 A1 | 4/2006 | Newmark | |
| 2006/0271977 A1 | 11/2006 | Lerman et al. | |
| 2006/0294538 A1 | 12/2006 | Li et al. | |
| 2007/0133034 A1 | 6/2007 | Jindall et al. | |
| 2007/0162487 A1 | 7/2007 | Frailey | |
| 2007/0203911 A1 | 8/2007 | Chiu | |
| 2007/0300271 A1 | 12/2007 | Allen et al. | |
| 2008/0143875 A1 | 6/2008 | Scott et al. | |
| 2008/0243692 A1 * | 10/2008 | Trimper et al. | 705/51 |
| 2008/0263589 A1 | 10/2008 | Jacobson et al. | |
| 2009/0012961 A1 | 1/2009 | Bramson et al. | |
| 2009/0012965 A1 * | 1/2009 | Franken | 707/10 |
| 2009/0037605 A1 | 2/2009 | Li | |
| 2009/0064250 A1 | 3/2009 | Nakata | |
| 2009/0070675 A1 | 3/2009 | Li | |
| 2009/0199234 A1 | 8/2009 | Mukerji et al. | |
| 2010/0066804 A1 | 3/2010 | Shoemake et al. | |
| 2010/0081116 A1 * | 4/2010 | Barasch et al. | 434/252 |
| 2010/0125795 A1 | 5/2010 | Yu et al. | |
| 2010/0205562 A1 | 8/2010 | De Heer | |
| 2010/0241623 A1 | 9/2010 | Acker et al. | |
| 2010/0274696 A1 | 10/2010 | Krietzman et al. | |
| 2010/0274847 A1 * | 10/2010 | Anderson et al. | 709/203 |
| 2010/0293580 A1 | 11/2010 | Latchman | |
| 2010/0306815 A1 | 12/2010 | Emerson et al. | |
| 2011/0030031 A1 | 2/2011 | Lussier et al. | |
| 2011/0037864 A1 | 2/2011 | Cao | |
| 2011/0113454 A1 | 5/2011 | Newell et al. | |
| 2011/0188836 A1 | 8/2011 | Popkiewicz et al. | |
| 2011/0191163 A1 | 8/2011 | Allaire et al. | |
| 2012/0041759 A1 * | 2/2012 | Barker et al. | 704/201 |
| 2012/0192225 A1 | 7/2012 | Harwell et al. | |
| 2012/0192239 A1 | 7/2012 | Harwell et al. | |
| 2012/0297423 A1 | 11/2012 | Kanojia et al. | |
| 2012/0304230 A1 | 11/2012 | Harwell et al. | |
| 2012/0304237 A1 | 11/2012 | Harwell et al. | |

OTHER PUBLICATIONS

International Search Report and Written Opinion of the International Searching Authority issued in international application No. PCT/US2012/022246, mailed Mar. 21, 2012, 12 pages.

Non-Final Office Action mailed Nov. 14, 2012 in U.S. Appl. No. 13/571,476 (20 pages).

Amendment filed Feb. 14, 2013 in U.S. Appl. No. 13/571,476 (14 pages).

Final Office Action mailed Mar. 12, 2013 in U.S. Appl. No. 13/571,476 (23 pages).

Interview Summary mailed Apr. 10, 2013 in U.S. Appl. No. 13/571,476 (3 pages).

Request for Continued Examination and Amendment filed Apr. 15, 2013 in U.S. Appl. No. 13/571,476 (22 pages).

* cited by examiner

312

316

314

318

320

CONTENT CREATION AND DISTRIBUTION SYSTEM

CROSS-REFERENCE TO RELATED APPLICATION

This application is a continuation-in-part application of, and claims priority to, U.S. patent application Ser. No. 13/013,775, entitled "User-Generated Social Television Content", to inventors Christopher W. Wyatt, Mark Harwell, and Ryland Reed, which was filed on Jan. 25, 2011. The disclosure of the foregoing application is incorporated herein by reference in its entirety.

BACKGROUND

It has become relatively easy for individuals and groups of individuals to take digital photographs and to record video, and to distribute this content to others over the Internet or other data networks. Such content is referred to as being "user generated" content. Still and video cameras, which are now common features on mobile phones, can be used to take photographs and to record videos that are immediately available for sharing with others through a multi-media messaging service or email, video file sharing sites, social network and similar services on the Internet that publish (to selected individuals or groups, or to everyone) or otherwise make available the photographs and video over the Internet. Some dedicated cameras and storage cards now have wireless or network connectivity and video can be uploaded to remote servers for sharing. Individuals or "consumers" distribute their photos and videos by uploading them to web-based services that publish them for friends, family, social or business contacts or anyone with access to the Internet to view. When user-generated content is uploaded or shared for a specific purpose, such as for example, in response to a widely disseminated request for a certain type of content, it may be referred to as crowd-sourced content.

Most consumer equipment capable of capturing photos or video is now able to do so in high definition. Inexpensive computer application programs allow individuals to edit photographs, videos and other graphics into a single work with nearly professional results, and to render the resulting work or "content" in standard formats for playback on a wide range of devices. Services for sharing user-generated video, photographs, and music abound on the Internet. For example, a number of video sharing sites allow people to upload, encode and share videos on the web.

On the other hand, most people still view professionally produced television programs ("programs") and motion pictures ("movies") using traditional television services. Programs are typically distributed to traditional television service providers by so-called "television networks", who possess the legal rights necessary to distribute the programs, and who are sometimes also involved in producing the programming. Those who provide transmission services for television, and provide television service to viewers, are referred to as "carriers" or Multi-Service Operators ("MSO"). Most television networks "sell" short periods of time during the programming for transmission of advertising, known as "commercials", "advertisements", "ads" or "ad spots", that promote businesses or programming on the network. These time slots can also be used for transmission of public service announcements. These time slots may also be used for any other promotional purposes.

Television transmission or distribution systems used by traditional carriers of television programming include terrestrial broadcast stations, satellite television, and cable television systems, as well as telecom delivery network services such as VDSL and FiOS offered over broadcast telecommunication or data networks, whose operators provide television services similar to what are offered by cable and satellite television service providers. However, standards have been formulated, or are in the process of being formulated, for using Internet protocols and the public Internet to distribute television programming using "live" IP-multicast or IP unicast streams that can be received by anyone with any type of broadband data connection to the Internet.

Though some television programs are available over the Internet and traditional carriers on an on-demand basis, traditional television programming for a television network is linear, meaning that programs—episode of a television series, a news program, or a movie, for example—are scheduled so that they are transmitted sequentially, according to a predefined schedule, to carriers for transmission over their systems for substantially contemporaneous receipt by their subscribers or, in the case of terrestrial broadcast stations, by those who receive their broadcast signal. In linear programming, the programs to be transmitted to the audience, and the schedule for transmitting of the programs, are usually planned in advance of the time of transmission to an audience. The programming schedule, usually expressed in the form of a programming grid, specifies what program and, if applicable, episode is to be transmitted on each day and at any given time during the periods in which the network is scheduled to transmit. Television programs can include, but are not limited to, television series, motion pictures, news programs, reality television programs, sporting events, and other audio/visual works. The programs are often pre-recorded. However, programs can be "live". Generally, such programs are professionally produced. The network either owns or licenses the legal rights to distribute them.

Traditional linear programming is commonly divided into thirty-minute or hour-long programming segments, though it can be divided into shorter or longer segments, depending on network preferences. Programs can occupy more than one segment. Within a typical thirty-minute program segment, for example, between twenty-two and twenty-six minutes are reserved for transmitting the program. The remaining time is divided among 2-5 segments for commercials and/or other promotional announcements. Those segments are typically subdivided into multiple time slots for sale to advertisers. The duration of the advertising segments and each of the time slots can be chosen to be any desired length. The network transmits, or arranges for transmission of, its signal so that the half-hour segments begin at the top and bottom of each hour. However, networks can, and do sometimes, adjust the start and end time of programs. A network may or may not transmit more than one signal, or "feed", to account for time zone differences or other considerations.

SUMMARY

Implementations of the present disclosure are generally directed to a video file content creation and distribution system (e.g., for the creation and distribution of user-generated and/or crowd-sourced video content). The system can include a content creation sub-system that provides users with a video file recording and editing system that provides an easy-to-use interface, does not require the users to have knowledge of video formatting or computer file systems, and automatically uploads video files or other content to a server. The video file recording and editing system can use a web server-based thin client application capable of displaying a user interface through a browser on a user device or a specialized application capable of running on a user device (e.g., on a mobile device or a tablet computer). In either case, the application can interface with user device's native recording capabilities to capture either high definition ("HD") format or standard definition ("SD") format video files. The video file recording and editing system guides the user through a video file creation and submission process that captures video via a video camera either built-in, or connected to, the user device to create a video file that meets requirements for submission to a content distribution sub-system, and submits the video file to the content distribution sub-system.

The content creation sub-system can facilitate convenient creation and seamless uploading of crowd-sourced video files (e.g., audio-visual content created in response to a broadcasted request for videos relating to a particular topic) or other user-generated content (e.g., video files generated by a user along with some form of payment for inclusion in a television broadcast). For example, the video file recording and editing system can ensure that the submitted video files satisfy certain parameters so that the files have a quality level appropriate for inclusion in linear television programming and so that the files can be automatically and conveniently transcoded into one or more video file formats (in accordance with relevant frame rates, bit rates, etc., which may be dependent on the intended destination of the content) according to the intended destination. The video files can be submitted through a particular web page and/or assigned a particular identifier indicating the type of submission (e.g., indicating that the video file is submitted in response to a specific request for video submissions, or indicating that the video file is intended for inclusion in an available linear programming segment of a specific program, or is meant to be seen only on the Internet as part of a video blog or other Internet experience).

The content distribution sub-system includes an administrator application capable of running on a computer (e.g., a server). The content distribution sub-system can perform electronic filtering of video files and can automatically transcode the video files into an appropriate format based upon destination (e.g., one format if the video content is intended for distribution via linear television programming and another format if intended for distribution on an Internet video blog). Based upon rights and/or administrative privileges, the administrator application allows a television or other production professional or Internet web site administrator to review user-generated or crowd-sourced video files through a web-based, server-based, or local video administration tool through which the producer or administrator can authorize certain video files for automatic inclusion in linear television programming over traditional or IP-based television distribution platforms. The content-distribution sub-system may also be used for production of content to be released in theaters (e.g., movies) and/or to send selected files to an editing system for more specific editing purposes. The video files can be organized according to data included in a uniform resource locator (URL) or other identifier indicating the type of submission. Accordingly, a producer or administrator can be presented with a set of videos that relate to a common topic or that are intended for possible inclusion within a particular linear television programming segment. The producer or administrator may also use filtering tools to determine which video files to review or which video files should be selected for inclusion in the linear programming. Once selected, video files are directed to an appropriate server for distribution to an appropriate destination (e.g., television or Internet).

In general, innovative aspects of the subject matter described in this disclosure may be embodied in methods that include the actions of receiving video data from a client computing device, automatically transcoding the video data, and uploading the transcoded video data to a server for distribution. The video data is captured using a camera connected to the client computing device in accordance with instructions executed on the client computing device to provide the video data in accordance with predetermined constraints. The video data is automatically transcoded using a server into at least one different format based on user credentials associated with a user of the client computing device and/or attributes associated with the video data. At least one format of the transcoded video data defines a video file in a format appropriate for inclusion in a linear television programming transmission. Other embodiments of this aspect include corresponding systems, apparatus, and computer programs, configured to perform the actions of the methods, encoded on computer storage devices.

These and other embodiments can each optionally include one or more of the following features. The instructions executed on the client computing device include scripts received by the client computing device from a web application. The instructions executed on the client computing device are executed within at least one of a browser or a browser plugin on the client computing device. The instructions executed on the client computing device are included in an application installed on the client computing device. At least a portion of the video data is buffered on the client computing device using scripts included in the instructions executed on the client computing device based on bandwidth constraints for transmitting the video data from the client computing device. The video data is transmitted by the client computing device in FLV format. The video data is transmitted by the client computing device in a native media container format for the client computing device. The predetermined constraints include a bit rate and an image resolution sufficient to enable transcoding of the video data into the format appropriate for inclusion in the linear television programming transmission. Transcoding the video data includes using a predetermined automated transcoding workflow corresponding to the predetermined constraints to transcode the video data into the transcoded video data. Transcoding the video data includes transcoding the video data into a plurality of different video file formats. An automated review of the video data and/or the transcoded video data is performed to identify potentially inappropriate content. The transcoded video data is retrieved for manual review, and a review interface is presented where the review interface is adapted to provide an indication of at least one frame within the transcoded video file including content identified as potentially inappropriate content and allow an administrator to select the transcoded video file for manual review. The transcoded video data is retrieved for manual review, a review interface adapted to allow an administrator to select among a plurality of transcoded video files for manual review is presented, a selection of a particular transcoded video file for review is received through the review interface, video defined by the particular transcoded video file is presented through the review interface in response to the selection, and a selection of the particular transcoded video file for publication is received through the review interface. Uploading the transcoded video data to a server is performed in response to the selection of the particular transcoded video file for publication. The video data is received in response to a request to submit content for potential inclusion in a linear television programming transmission. Automatically transcoding the video data includes transcoding the video data into at least one format appropriate for Internet distribution, and the transcoded video data is stored in the at least one format appropriate for Internet distribution on a web server adapted to allow retrieval through a web page. The transcoded video data is distributed to a plurality of social networking web sites. The transcoded video data is distributed in a video blog.

Other aspects of the subject matter described in this disclosure may be embodied in methods that include the actions of displaying, on a client computing device, a user interface adapted to allow a user to selectively record content including high definition video content through a digital camera communicably coupled to the client computing device, receiving a user selection to record content, and capturing high definition video data using the digital camera during a continuous recording segment. The high definition video data is formatted in accordance with predetermined constraints, and at least a portion of the formatted high definition video data is transmitted to a storage server during the continuous recording segment. Other embodiments of this aspect include corresponding systems, apparatus, and computer programs, configured to perform the actions of the methods, encoded on computer storage devices.

These and other embodiments can each optionally include one or more of the following features. Formatting the high definition video data includes formatting the high definition video data in FLV format. The operations are performed using scripts transmitted to the client computing device in a web page and executed on the client device using at least one of a web browser or a web browser plugin. The predetermined constraints are adapted to enable a transcoding server to perform automated transcoding of the high definition video data into a plurality of video file formats. A portion of the high definition video data is cached on the client computing device for transmission in accordance with bandwidth limitations on transmitting the formatted high definition video data. One or more attributes are associated with the formatted high definition video data, where the one or more attributes are associated with a request for submissions of content to be included in a television broadcast and/or a user credential.

Other aspects of the subject matter described in this disclosure may be embodied in methods that include the actions of displaying, on a client computing device, a user interface adapted to allow a user to selectively record content including high definition video content through a digital camera communicably coupled to the client computing device, receiving a user selection to record content, and capturing high definition video data using the digital camera during a continuous recording segment. The high definition video data is formatted in accordance with predetermined constraints. A connection is established with a content submission server in response to a user selection to upload the high definition video data, and the formatted high definition video data is transmitted to a storage server using the connection in response to the user selection. The predetermined constraints are adapted to facilitate transcoding of the formatted high definition video data into a format appropriate for inclusion in a linear television programming transmission. Other embodiments of this aspect include corresponding systems, apparatus, and computer programs, configured to perform the actions of the methods, encoded on computer storage devices.

These and other embodiments can each optionally include one or more of the following features. Formatting the high definition video data includes formatting the high definition video data in a native media container format for the client computing device. The operations are performed using instructions transmitted to the client computing device downloaded from a web server and installed on the client device, and capturing high definition video data using the digital camera includes interfacing with native device recording capabilities. The predetermined constraints are adapted to enable a transcoding server to perform automated transcoding of the high definition video data into a plurality of video file formats. One or more attributes are associated with the formatted high definition video data, and the one or more attributes are associated with a request for submissions of content to be included in a television broadcast and/or a user credential. A connection is established with a web server to retrieve at least one attribute associated with a request for submissions of content.

Other aspects of the subject matter described in this disclosure may be embodied in systems that include a user device and one or more servers operable to interact with the user device. The one or more servers are further operable to receive video data in a predetermined format from the user device, transcode the video data into one or more video formats that differ from the predetermined format using an automated transcoding workflow corresponding to the predetermined format, store the transcoded video data, and distribute the transcoded video data for inclusion in a television transmission. Other embodiments of this aspect include corresponding methods, apparatus, and computer programs, configured to perform the actions of the methods, encoded on computer storage devices.

These and other embodiments can each optionally include one or more of the following features. The one or more servers are further adapted to provide instructions for execution on the user device in a web page, wherein the instructions are adapted to cause the user device to capture the video data using a camera connected to the user device and to transmit at least a portion of the video data to a web server of the one or more servers as the video data is captured. The one or more servers are further adapted to transcode the video data into a format appropriate for inclusion in a linear television programming transmission. The one or more servers are further adapted to transcode the video data into a format appropriate for Internet distribution. The one or more servers are further adapted to transcode the video data into a plurality of different formats. The one or more servers are further adapted to perform an automated review of at least one of the video data or the transcoded video data to identify potentially inappropriate content. The one or more servers are further adapted to retrieve the transcoded video data for manual review and present a review interface adapted to provide an indication of at least one frame within the transcoded video file including content identified as potentially inappropriate content, and allow an administrator to select the transcoded video file for manual review. The one or more servers are further adapted to retrieve the transcoded video data for manual review, present a review interface adapted to allow an administrator to select among a plurality of transcoded video files for manual review, receive a selection of a particular transcoded video file for review through the review interface, present video defined by the particular transcoded video file through the review interface in response to the selection, and receive a selection of the particular transcoded video file for inclusion in the television broadcast. The transcoded video data is distributed for inclusion in a television broadcast in response to the selection of the particular transcoded video file for inclusion in the television broadcast. The one or more video formats are selected based on at least one of user credentials associated with a user of the user device or attributes associated with the video data.

Particular embodiments of the subject matter described in this specification can be implemented so as to realize one or more of the following advantages. The subject matter can be used to encourage submission of, and facilitate curation of, crowd-source video or other user-generated content. The content creation sub-system can be used to ensure that video files are received in one or more preselected formats and in accordance with predetermined parameters, which can facilitate automated transcoding according to one or more software-implemented transcoding workflows. Video can be quickly and conveniently transcoded into one or more formats appropriate for selected types of distribution (e.g., linear television programming or Internet distribution). Received video can be transcoded for virtually immediate distribution and broadcast. Video can be automatically filtered to identify potentially inappropriate material (e.g., body parts, language, copyrighted material) for exclusion or manual review by an administrator. The subject matter can be used to encourage crowd-sourced video submission and to provide an interactive production process and can eliminate confusion, time, and expense associated with sourcing and copying crowd-sourced or user generated content that can potentially be generated in multiple formats, frame rates, and bit rates by, among other things, automatically transcoding video content into a particular format that is ready for distribution through television in addition to automatically transcoding the video content into other formats that can be used for other content distribution outlets. These techniques can reduce cost at the production stage and can provide a production team with more time for creative aspects of a production process to produce a more compelling broadcasting product. Videos can be segmented based on user credentials and/or attributes associated with the content (e.g., identifying a program for which the content is being submitted).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are directed to systems and methods of creating and distributing crowd-sourced or other user-generated video content. Video content is captured on a user device and formatted according to pre-determined constraints using a web application or an installed application. The video content, for example, can be requested for inclusion in a television program. By formatting the video content according to predetermined constraints, the video content can be transcoded into a format appropriate for inclusion in a linear television programming schedule using an automated transcoding workflow corresponding to the predetermined format to ensure that the transcoded video file complies with requirements of a particular television broadcaster or television uplink facility. The video can also be automatically transcoded into one or more additional formats appropriate for alternative distribution media (e.g., Internet distribution or inclusion in a movie production). The video file can undergo an automated review process to check for inappropriate content and/or to confirm compliance with formatting requirements. The video file can also undergo a manual review for content marked as potentially inappropriate and/or to select among available videos for inclusion in a television production. Based on the manual review or through an automated assignment process, a selected video file can be integrated into a linear television programming schedule (e.g., by associating the video file with a specific slot in the linear programming schedule). Transcoding and review can be performed in accordance with attributes associated with the video content (e.g., identifying a particular television program that the video content is intended to potentially be included in) and/or user credentials for a user that submitted the content (e.g., user credentials indicating whether the user is authorized to submit content for Internet and/or television distribution).

Figure 1:
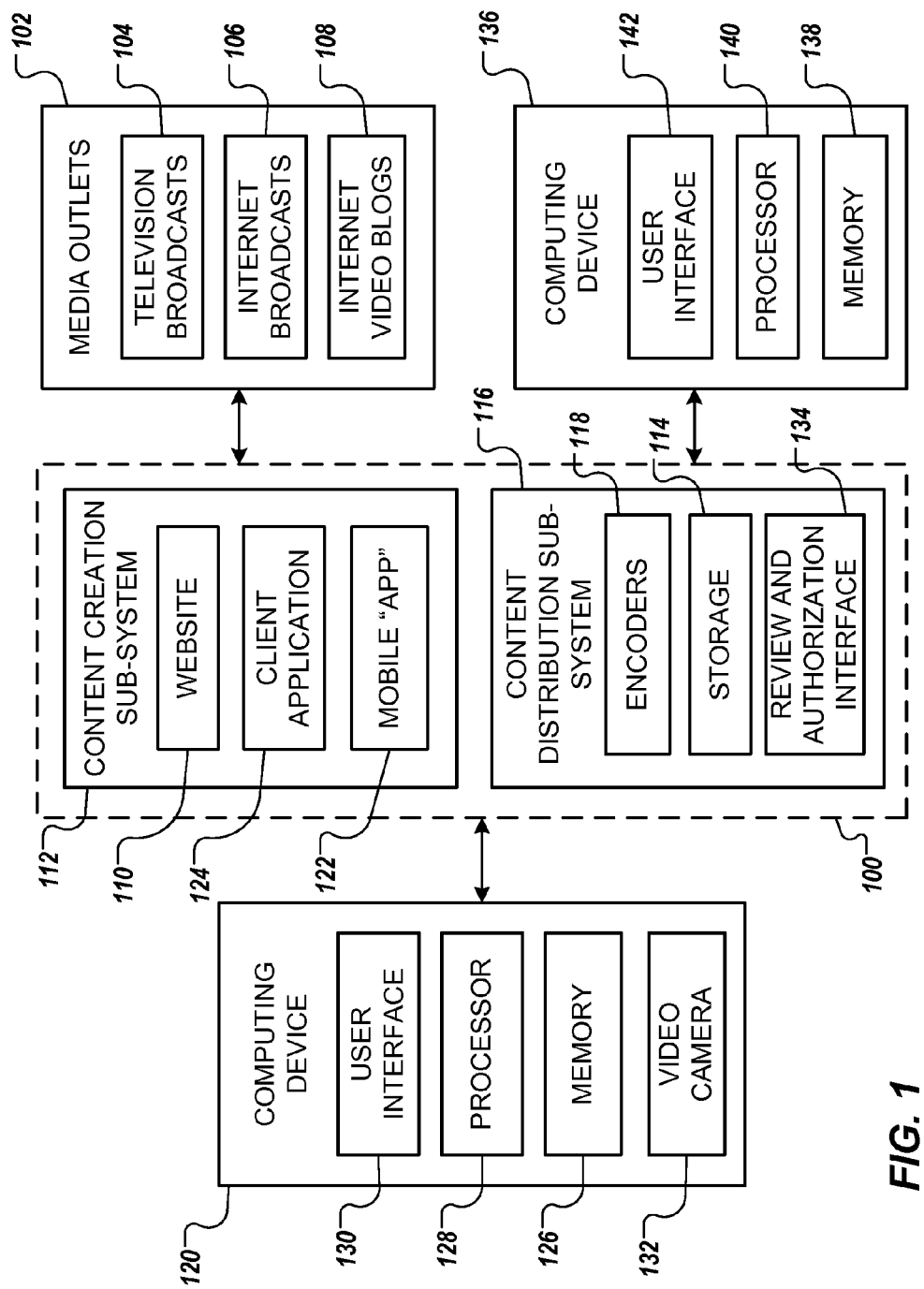
FIG. 1 is a functional block diagram of the content creation and distribution system.

FIG. 1 depicts an example content creation and distribution system (CCDS) 100. The CCDS 100 can be provided as a complex set of interconnected software and server systems. These software and systems can be used to record, transcode, transfer, save, and play-back user-generated, digital audio/visual content so that various end users can upload user-captured and/or user-created digital audio/visual content from a variety of digital sources for the purpose of airing or distributing that content through one or more content distribution outlets. The content can be provided in standard definition (SD) (e.g., less than 500,000 pixels per frame) or high definition (HD) (e.g., greater than 500,000 pixels per frame, and typically at least 750,000 pixels per frame). The content can be aired or distributed by various media outlets 102, including, for example, on television broadcasts 104, Internet television 106, video blogs 108, video on demand (VOD), within various computer-based social networks, and/or within other online media (e.g., video file sharing services) and applications. In general, content can be in the form of video (with or without accompanying audio), can be user-generated or crowd-sourced, and can be represented in files (e.g., video files).

Generally, broadcasts can include the distribution of audio and video content to a dispersed audience. Television broadcasts, for example, can include the distribution of content using air-wave, satellite, and/or cable technologies. Internet broadcast may also be used and may facilitate distribution to a single view or to multiple viewers (e.g., depending on viewing authorizations and whether the transmission is distributed on demand or as a one to many broadcast).

In some implementations, CCDS 100 includes a content creation sub-system 112 and a content distribution sub-system 116. The content creation sub-system 112 can include a website 110 that is hosted using one or more computing devices (e.g., server systems), a client application 124 that is at least partially executable on a client computing device, and a mobile application 122 that is executable on a mobile computing device. The content distribution sub-system 116 can include encoders (e.g., for encoding raw data or other uncompressed video format data into a compressed video format) and/or transcoders (e.g., for transcoding one compressed video format into another compressed video format) 118, storage servers 114 (e.g., computer-readable memory) and a review and authorization interface 134. Components of the content creation sub-system 112 and the content distribution sub-system 116 can be provided as one or more application programs that can be executed using one or more computing devices, and/or one or more hardware components (e.g., computing devices and/or computer-readable memory). In some implementations, the content creation sub-system is provided as an application that is installed on a user computing device 120 to generate digital content, and/or a back-end computing device, such as a server system that communicates with the user computing device 120 to provide a thin client application that is executed in part on the server system and in part on the user computing device 120 (e.g., using a browser application on the user computing device 120). In some implementations, the content distribution sub-system 116 can be executed on a user computing device 136, and/or a back-end computing device, such as a server system that communicates with the user computing device 136.

Based upon a user's registration credentials and permissions, which can be established in part by registration with website 110 of content creation sub-system 112, and/or on attributes (e.g., identifying a web page through which the video is submitted) associated with submitted content, the user's content can be automatically distributed to one or multiple storage locations 114 of content distribution sub-system 116 for use and/or for production review. Using encoders 118, digital content provided by the user can be transcoded to an appropriate digital media format for use by destination media outlets 102 (e.g., within television broadcasts 104, Internet broadcasts 106, Internet Video blogs 108, and/or other distribution media, including other types of Internet distribution or for theatrical production, e.g., for presentation in a movie theater). In some implementations, the destination outlets can include an online video blog service, as described with reference to FIGS. 7, 8A, and 8B of U.S. patent application Ser. No. 13/013,775.

When the content creation sub-system is implemented as a thin client application or a specialized application installed on a user device, the application can enforce predetermined constraints on the captured video. Such constraints can help ensure that the video is in condition to be rapidly transcoded for insertion into a linear programming time slot. For example, the application can encode the video and accompanying audio data at a sufficient bit rate and resolution, among other things, to ensure that the video file can be transcoded to produce video of sufficient quality to be televised and/or to be distributed on the Internet (i.e., in accordance with minimum quality requirements of the television producer or other distributor). By ensuring that the crowd-sourced video or other user-generated content complies with predetermined parameters through the application of the content creation subsystem, it is possible to transcode the video or other content and perform a review and/or selection so that the video or other content can be inserted within the same television show in which the request to submit the video or other content is made. Among other things, the application can encode the video into a predetermined format to ensure that the video file is ready for transcoding using a predetermined transcoder and predetermined transcoding parameters (or a limited set of predetermined transcoders and/or transcoding parameters). In other words, the incoming video file can be transcoded using a predetermined transcoding process without having to interpret the data, develop a transcoding process, edit the video, and/or perform manual processing. Such techniques allow received video to be quickly transcoded and can facilitate incorporating captured video into linear programming within minutes of capture.

The client application (i.e., either thin client application or installed application) can also enforce restrictions on the length of a video that is captured for submission. For example, if a video is generated in response to a specific request for video or other content submissions, users may be directed to a particular web page associated with the request. By accessing the thin client through that web page and/or by delivering parameters to a locally installed application on the user device, a video length restriction can be enforced (i.e., the user can be prevented from capturing or submitting videos that do not comply with the length restrictions). In some implementations, the content creation sub-system can allow recordings of various durations suitable for including in time slots of linear programming (e.g., 15 seconds, 30 seconds, etc.). For example, an affinity group may not have its own television program affiliated with its own private-label social media website. In such an instance, members of the affinity group may not have the option to record a 15-second "famespot" for inclusion in that affinity group's television program. They may, however, be given rights to record and submit a 30-second "peoplemercial" that may be viewed on various programs within a television programming lineup. Other predetermined lengths may also be used. By enforcing length restrictions, the need to edit the video can be avoided, which can also expedite the process of inserting video into a linear programming sequence. Users may also be allowed to submit a video file of unspecified length for inclusion on an Internet video blog or as part of a linear program, otherwise known as a "social clip".

Although use of a thin client or specialized application can help enforce restrictions that can facilitate rapid transcoding and avoid editing, video files that are captured using commercially available software can also be submitted to the CCDS 100. Such files may be screened to ensure compliance with any predetermined constraints (e.g., format and length) that apply to the submission. The constraints may vary, for example, depending on whether the submission is intended for distribution through high-definition television programming, through standard-definition programming, or through the Internet. Submissions that do not comply with the formatting requirements can be rejected for use with the intended programming and/or stored (e.g., for potentially off-line transcoding and/or for retrieval over the Internet).

To create, edit and upload digital content (e.g., crowd-sourced video files), a user can make use of the computing device 120. Example computing devices 120 can include any type of computing device such as a desktop computer, a laptop computer, a handheld computer, a tablet, a personal digital assistant (PDA), a cellular telephone, a network appliance, a camera, a smart phone, an enhanced general packet radio service (EGPRS) mobile phone, or a combination of any two or more of these data processing devices or other data processing devices. The computing device 120 can communicate with the CCDS 100 over a network. The network can include a large computer network, such as a local area network (LAN), wide area network (WAN), the Internet, a cellular network, a satellite, or a combination thereof connecting any number of mobile computing devices, fixed computing devices, and/or server systems.

As discussed in further detail herein, the creation and editing of digital content can be achieved in various manners. For example, the computing device 120 can execute a thin client application to provide input to a server-side computing device over a network. The thin client application can include scripts (e.g., JavaScript, ActionScript) to record and transmit digital (e.g., video file) content to the server-side computing device. As another example, an application can be downloaded to the computing device 120 (e.g., in instances where device 120 is a mobile device, tablet computer, or other computing device that does not support scripts or other features necessary to run the thin client application), which application can be executed to create and generate digital content locally at the computing device 120. The native recording capabilities of the user computing device 120 can be accessed to receive captured video and audio data through an API on the computing device 120. As another example, the computing device 120 can provide a web interface that enables a user to upload pre-generated video content to the servers.

The computing device 120, from which a user can create and upload digital content, can also impact permissions and distribution of the digital content. For example, given certain restrictions on wireless data networks, submissions from a smart phone or tablet may not be available until the user connects to a wireless data access network (LAN, WiFi, 3G, 4G, etc. network) that will allow a more efficacious upload of the content. As described in greater detail below, mobile application software 122 can be downloaded to and executed on the computing device 120, which can use the mobile application software 122 to record digital video content, for example, in a local file first as a mobile video file format, and then transmit the mobile video file for transcoding and storage on different servers according to the user's intended final destination for the video content. In some implementations, as discussed further herein, a client application 124 can be downloaded to and executed on the computing device 120 and can be used to record video to local memory 126 and/or to storage locations 114 of the distribution sub-system 116. As another alternative, the client application 124 can be implemented as a thin client application, such that the recorder functionality can be accessed through a web page interface without installing software locally on the computing device 120. For example, a user can access a web page through browser software on the computing device 120. The web page can provide an interface for controlling an HD video capture process using a camera attached to or incorporated into the computing device 120. Scripts within the web page can be used to receive audio and video data through APIs on the computing device 120 and to format the data into an appropriate format for delivery to the content distribution sub-system 116.

In operation, the mobile application 122 software and/or client application 124 software can provide an system that guides the user through the recording and submission process with minimal effort or knowledge of formatting, file systems, and uploading on the part of the user. This system can employ the user interface 130 of the computing device 120 to guide the user through a video capture process, using an SD or HD digital video camera 132 on or attached to the computing device 120 to obtain a video file suitable for submission to the content distribution sub-system 116.

Video files uploaded or recorded from the device 120 to the storage locations 114 can be reviewed by a reviewing user (e.g., professional) using the review and authorization interface 134 of distribution sub-system 116. The authorization interface 134 enables the reviewing user to review and authorize video files for inclusion in linear programming for distribution by broadcast television and/or Internet television and/or other various forms of Internet publication, such as in video blogs or independently on a video file sharing service. The authorization interface 134 can also allow the reviewing user to sort and filter submissions according to appropriate factors (e.g., a popularity of the submitting entity or individual; a frequency of submission by the submitting entity or individual; a rating or number of points associated with the submitting entity or individual; title; type of submission; content label associated with the submission; length of video; whether the video includes any content flagged as questionable material; etc.).

In some implementations, the review and authorization interface 134 can be downloaded to and run on the computing device 136 and can use the computing device's memory 138, processor 140, and user interface 142. In some implementations, the authorization interface 134 can be implemented as an application that is executed using one or more servers, where the computing device 136 can execute a thin client application to provide input to the one or more servers over a network.

The authorization interface 134 can be used to allow a television producer to select crowd-sourced video files for inclusion in live or pre-recorded linear television programming without the need for a third-party editing system. For example, the content creation sub-system 112 and/or features built into the content distribution sub-system 116 can ensure that received video does not require editing (e.g., by generating an initial video file in FLV format or otherwise) and that it includes an appropriate bit rate and frame rate, and/or can filter out video that does not meet predetermined quality parameters, length parameters, editorial constraints, or other constraints). Before or during a television program, the television producer can solicit submission from viewers of video on a particular topic. The videos can be submitted in association with information identifying the television program for which the video is being submitted (e.g., by submitting the video through a particular web page). Videos submitted for a particular television program can be separated from other videos. Submitted videos can be retrieved simultaneously or sequentially for review and selection by one or more administrators. For example, the administrators may select video for immediate or nearly immediate inclusion in an available slot in the television program. By enforcing particular formatting requirements for the video files that are submitted, the video can be rapidly transcoded without the need to interpret the received data or to modify the transcoder. Moreover, time slots within a television program can be predefined for subsequent insertion of crowd-sourced content.

Figure 2:
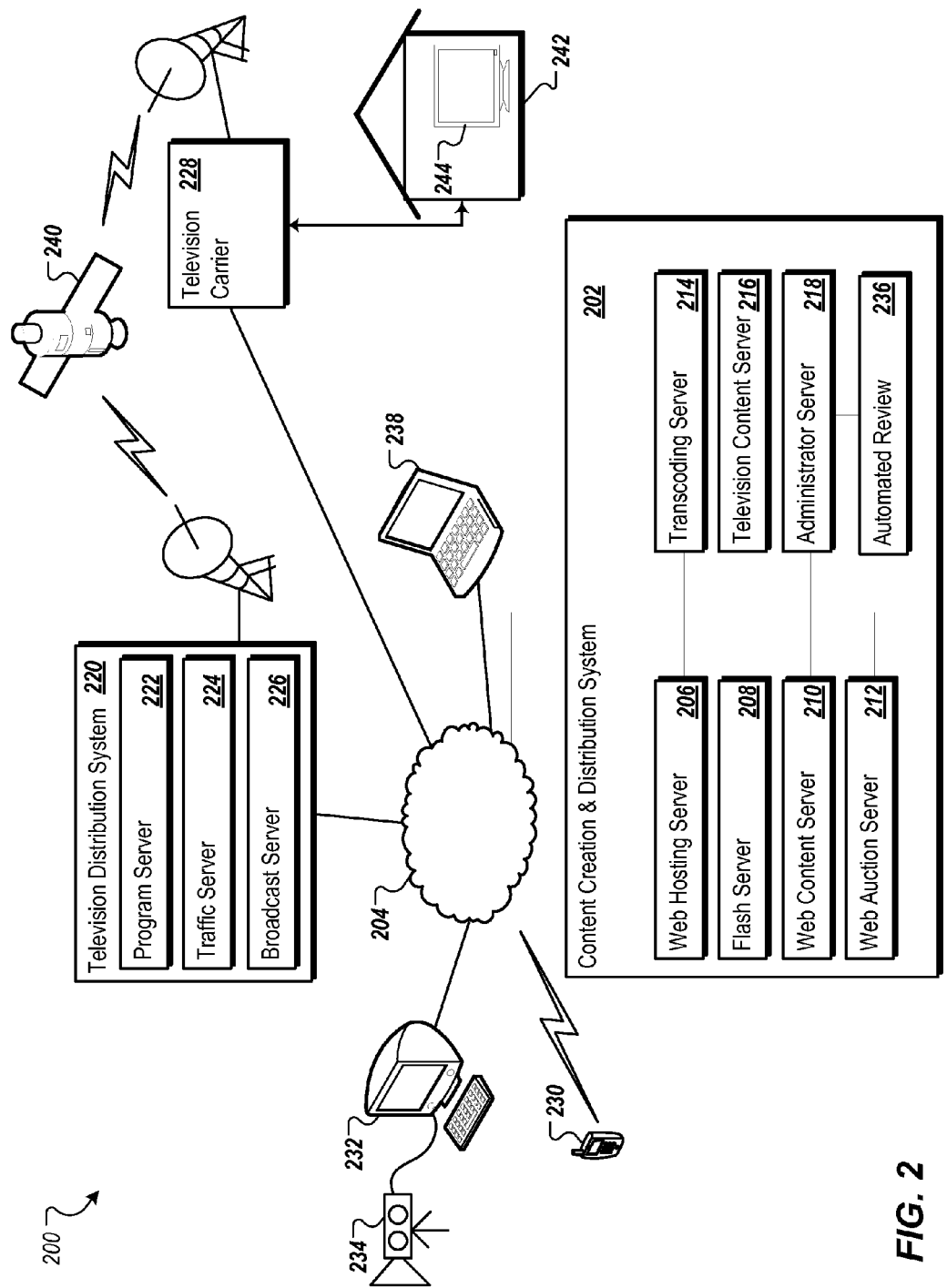
FIG. 2 illustrates a block diagram of basic components of a representative example of a content creation and distribution system architecture
Figure 5:
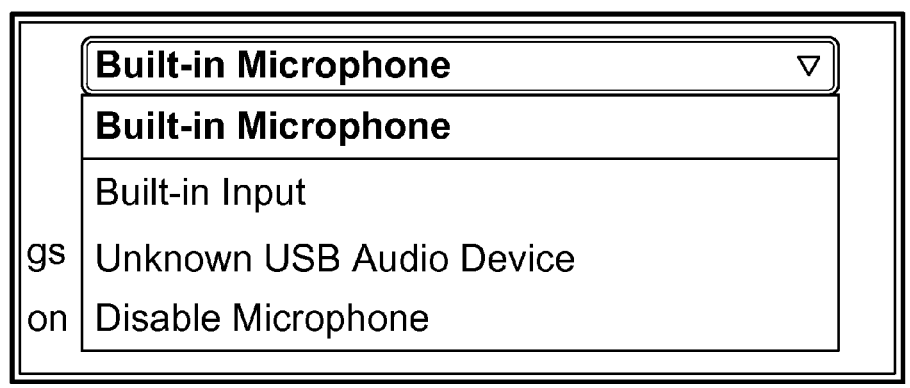
FIG. 5 is an illustration of an audio source selection control of the web-based recording and uploading user interface of FIG. 3.
Figure 6:
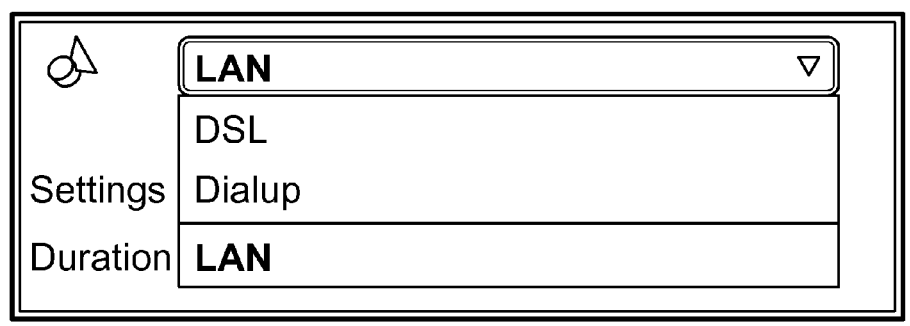
FIG. 6 is an illustration of an Internet speed selection control of the web-based recording and uploading user interface of FIG. 3.

FIG. 2 shows an example system 200 that includes an implementation of a CCDS 202. The system 200 can include a collection of servers connected to one or more communications network(s) 204, such as the Internet, cellular networks, satellite networks, cable networks, optical networks, and/or combinations thereof. In some implementations, the CCDS 202 includes a plurality of servers, which can be implemented on any number of computers. The CCDS 202 can include a web hosting server 206, a Flash server 208, a web content server 210, a web auction server 212, a transcoding server 214, a television content server 216, and an administrator server 218. The servers in the CCDS 202 can communicate with one another through one or more networks (e.g., a local area network and/or a wide area network). In some implementations, the system 200 can be implemented within an environment such as depicted in and described with reference to FIG. 1 of U.S. patent application Ser. No. 13/013,775. The system 200 can be used, for example, to perform the process depicted in and described with reference to FIGS. 2A and 2B of U.S. patent application Ser. No. 13/013,775. The system 200 or the CCDS 202 can further support a ticker service as described depicted in and described with reference to FIGS. 5, 6A and 6B of U.S. patent application Ser. No. 13/013,775.

The CCDS 202 communicates with a television distribution system 220, which can include a network operations center for a television network and/or an uplink facility from which a television network feed is distributed to carriers 228 that provide television services. The television distribution system 220 generally includes a program server 222 for scheduling programs on the network; a traffic server 224 that keeps track of insertion points for insertion of prerecorded commercials, promotional spots, and other announcements within each scheduled television program; and a broadcast server 226 that generates a linear programming feed for transmission to the carriers 228.

A user having a mobile device 230 (e.g., smart phone, tablet, etc.) capable of capturing SD or HD video or a computing device 232 having a video camera 234 (e.g., built-in or aftermarket peripheral camera attached via wired or wireless connection) can connect to the communications network(s) 204 and interface with the CCDS 202 (e.g., through the web hosting server 206). The web hosting server 206 can provide one or more web pages through which users can access services provided by the CCDS 202. For example, the web hosting server 206 can host a registration web page that allows users to register with the CCDS 202 and a HD recorder web page that provides users with access to a thin client application (or web application) that supports video capture (as discussed below in connection with FIGS. 3-15). In addition, the web hosting server 206 can allow fat client applications to be downloaded to and installed on the mobile device 230 or computing device 232. In general, a thin client or web application can provide a frictionless user experience because no installation of software is necessary to capture and submit broadcast quality video, provided that the user has basic hardware (i.e., a computing device and a camera either built into, or attached to the computing device) necessary to perform audio and video capture. An installed application may be necessary or desired in some cases, e.g., where the mobile device 230 or computing device 232 lacks support for a scripting language used to implement the thin client functionality or when capture is to be performed offline. Nonetheless, such an installed application can perform the same operations and provide the same functionality as the thin client application. In some cases, web hosting server 206 can provide video capture functionality for a third party web site (e.g., a third party web site that links to the web hosting server 206 for use in capturing video for a television network associated with the third party web site).

In some embodiments, when a user accesses the video capture functionality of the CCDS 202 (e.g., through a thin client application hosted on the web hosting server 206), the video capture interface can be provided, at least in part, using the Flash® server 208. In particular, the Flash® server 208 can serve a Flash®-based interface to the mobile device 230 or computing device 232 for use in capturing video. For example, the Flash® server 208 can provide scripts that allow the user to define settings through the Flash®-based interface and that receive video data through an application programming interface (API) on the mobile device 230 or computing device 232 for transmission to the CCDS 202.

Video data can be transmitted from the mobile device 230 or computing device 232 to the web content server 210. Video data that is captured using the Flash® server 208 can be transmitted (e.g., in FLV format) as the video data is captured, although there may be some buffering of data to ensure compliance with video quality constraints, as discussed further in this specification. Video data can also be stored on the device 230 or 232 (e.g., using a specialized or third-party application installed on the device) and uploaded after the video file is complete. For example, the video data may be captured in H.264 or MP4 format, stored locally on a mobile device 230 or computing device 232, and uploaded to the web content server 210 through a thin client application or installed application on the mobile device 230 or computing device 232.

Video data received at the web content server 210 can be stored in its native format (e.g., FLV, H.264, MP4, etc.) on the web content server 210 or a database associated with the web content server. The stored video data can be automatically transcoded by the transcoding server 214 into one or more alternative formats. The transcoding can be dependent upon user credentials (e.g., whether the user has registered to upload video for web distribution and/or for television distribution, whether the user has been approved for uploading certain types of content, whether the user has been barred from certain types of submissions for prior submissions of inappropriate content, etc.) and can be based on the type of submission. For example, a submission in response to a request for videos on a certain subject and/or a submission intended for inclusion in a certain program can be submitted through a particular web page, which may result in the video data being automatically transcoded into one or more specific formats (e.g., a television format and a web format). Transcoding can also include adding source indicia (e.g., in a lower right hand corner to show the television channel on which the video is broadcast) or other additional information (e.g., a ticker or other information bar at the bottom of the video display). The transcoded video data can be stored (possibly along with a retained version of the native video data) on the web content server 210, the television content server 214, or another database associated with the CCDS 202. The video data can be retrieved for viewing through the network 204 and/or for distribution via television or on a web page. In some cases, videos can be distributed according to an auction process using the auction server 212, or using other consideration (e.g., virtual credits), as described in pending U.S. patent application Ser. No. 13/013,775 (e.g., with reference to FIG. 4), the content of which is incorporated in this specification by reference.

Video content stored on the web content server 210, the television content server 216, or another database can be reviewed using an administration server 218. The video content can be reviewed for inappropriate content and/or for evaluation (e.g., for inclusion in a particular segment of linear programming). In some implementations, the review can be at least partially automated using an automated review server 236, which can be included as part of the CCDS 202 or hosted on a third party server. The automated review server 236, for example, can scan the video frames and accompanying audio data to compare the video and audio against databases of pornographic material, profanity, or other inappropriate material to identify similarities. Frames with content identified as questionable can be flagged for further manual review or, in some cases, can be automatically disqualified for distribution. The video content can also be organized for review using the administration server 218 according to the intended type of distribution (e.g., web or television) and program (e.g., such that an administrator can review only videos submitted for inclusion in a particular program). Manual review can be conducted by retrieving the videos using the administrator server 218 through a thin client application or an installed application local to the CCDS 202 or using a computing device 238 that accesses the administrator server 218 across the network 204. The administration server 218 can also be used to select videos for inclusion in linear programming and to assign a particular segment in which a video is included in linear programming. For example, the administration server 218 can access the television distribution system 220 to assign a video to an available time slot or segment in a linear programming sequence and/or to associate a previously assigned content name included in the linear programming sequence (e.g., a content name used as a placeholder for subsequently generated video) to a video submitted through the CCDS 202.

The television distribution system 220 can include a network operations center for a television network and/or an uplink facility as described in the '775 application. Generally, the program server 222 maintains a database that specifies the program, the episode, the date of transmission, and start and stop times of each. Even when a program is "live", it is accounted for in the programming grid utilizing the programming system. The program server 222 also typically includes additional information on each program, such as its title, describing the program so that it can be published in program guides, etc. For example, a network can use the program server 222, located within a network operations center, for scheduling programs on that network. Networks that sell advertising will also typically operate or make use of a traffic server 224 that is part of a network operations center. The traffic server keeps track of time slots, or so-called "insertion points", within each scheduled TV program, that have been set aside for insertion of a prerecorded commercials, promotional spots, and other announcements. The traffic server 224 stores information about each time slot in one or more databases on one or more servers. The broadcast server 226 is used in connection with creating or generating a linear programming feed or television signal that will be transmitted to the television carriers 228. The broadcast server 226 assembles a program and any insertions into a continuous linear signal according to a schedule stored by the program server 222 and the insertion points specified in the traffic server 224. Video content from the CCDS 202 can be retrieved by the television distribution system 220 using, e.g., a file transfer protocol according to data provided when the administrator server 218 is used to assign a particular video to a specific time slot.

The programming of a television network—the network's signal or feed—is typically distributed to viewers via one or more local broadcast television stations for local broadcast and/or one or more carriers for transmission on other mediums, such as cable TV systems, wired or wireless high-speed broadband networks, mobile data networks, satellite television systems, for substantially simultaneous viewing by multiple users.

A TV program to which a network has distribution rights could also be delivered "on demand", meaning at the request of a viewer, in which case program transmission to that user begins at the request of a user and continues according to a predefined timeline. Such on-demand programs generally do not, but could, include predefined time slots within the timeline of the program for advertising, promotional announcements, and other uses. However, transmission of such on-demand programming usually originates from the carrier, such as at the head end of a cable network, or from a server that streams the video over the Internet to the user requesting it.

Typically, a network's signal or feed is transmitted by, or on behalf of the network, distributed simultaneously to one or more TV carriers across some or all of a country or continent using a satellite transmission system. However, other transmission systems, or combinations of systems, can be used. A television network may own and operate its own uplink facility, or it may choose to contract with one or more third party uplink facilities to transmit its signal up to a satellite 240 for distribution to one or more television carriers 228. These television carriers 228 receive the satellite signal and transmit it on their systems to subscribers, who are represented by home 242, but can include any type of residence, as well as bars, restaurants, theatres and other commercial establishments. Each subscriber has, in this example, a set top box or some other gateway or device that receives and decodes the signal so that it can be played on a television or monitor 244. Representative examples of television carriers 228 include a television service offered over a wired, terrestrial system, e.g., a cable television system or a cable-like television service provided over a telecommunication network system, such as the Verizon FiOS® or AT&T U-VERSE® services, and a satellite television system, such as DirectTV. Other types of distribution systems could be used for transmitting a network's feed to subscribers, including IP television services, which use the Internet protocols and packet-switched networking architectures to carry the signal to subscribers. The television signal or feed generated by the broadcast server 226, is, for example, transmitted to an IP television service provider through a satellite uplink or, alternately, a private network or other connection.

Figure 3:
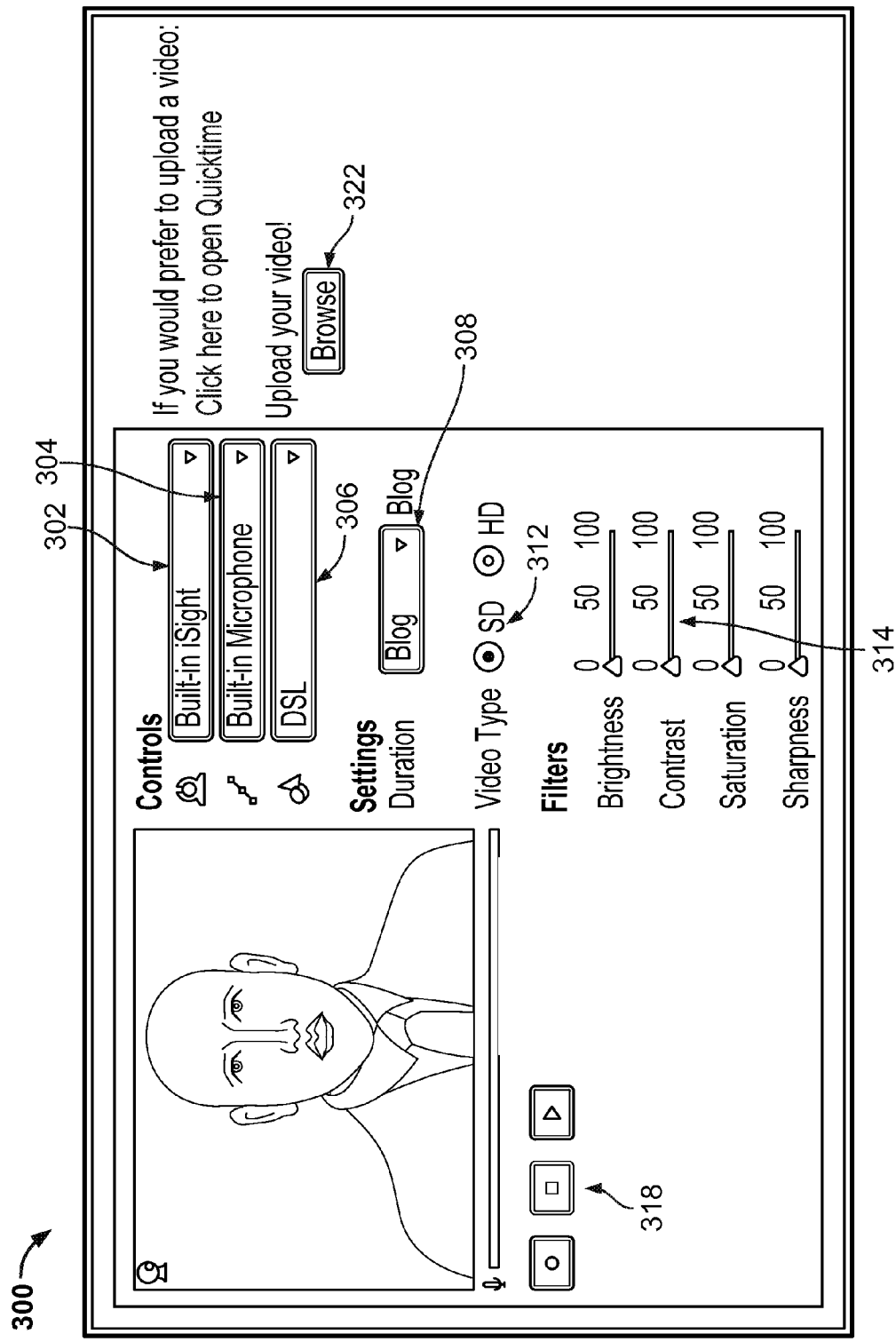
FIG. 3 is an example of a web-based recording and uploading user interface.
Figure 4:
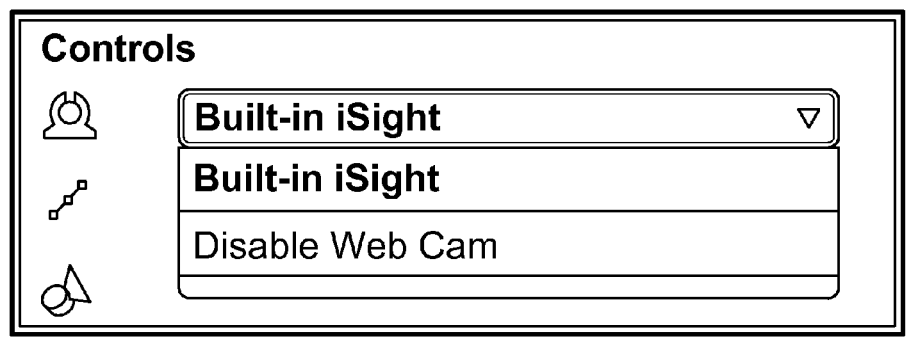
FIG. 4 is an illustration of a video source selection control of the web-based recording and uploading user interface of FIG. 3.

Referring now to FIG. 3, the CCDS can be accessed using a software interface that is executed on a user computing device. In some implementations, the software can provide a web-based recording, editing, and uploading user interface 300. For example, the user interface 300 can be implemented as the user interface depicted in and described with reference to FIG. 3 of U.S. patent application Ser. No. 13/013,775. The interface 300 can serve as a user-facing front-end of the CCDS, enabling a user to record and upload digital content (e.g., digital video) for distribution. In some implementations, the interface 300 enables a registered user to record an SD or HD video that is sent to the CCDS for storage or distribution to appropriate locations. For example, the user can use a computer with a built-in digital video camera, a peripheral digital video camera attached to a computer, and/or a mobile device with a built-in camera and a pre-defined application to generate digital video content that is streamed to the CCDS substantially in real time as the content is created. Thus, the camera is communicably coupled to the computer or other user device. In some implementations, the interface 300 enables the user to upload a pre-recorded video file that is stored in computer-readable memory to the CCDS.

In operation, the CCDS can perform as an automated system that considers one or more of the following factors: (1) an individual user's credentials and affiliations; (2) an individual user's recording and up-loading device; and/or (3) an individual user's desired destination for the media file. Considering these factors, the CCDS can automatically determine both the source and the destination(s) of a user-generated video file, and then determine and transcode the file into the appropriate digital format(s) based upon the final destination (s) and viewing purpose (e.g., television or Internet) of the video file. User credentials and/or attributes associated with the video content submitted by a user can be used to determine which administrator(s) should review the video (e.g., so a particular administrator only has to review videos submitted for his or her assigned programming) and to determine whether the individual is permitted to submit videos for certain types of distribution. For example, user credentials can be updated over time to increment a user rating based on quality content or other factors and/or to decrement the user rating based on submission of inappropriate content.

In some implementations, as discussed in further detail herein, the interface 300 provides a recorder that utilizes Adobe® Flash® recording technology to reduce the behavioral friction associated with creating and publishing video content using the Internet. This option not only prevents the need for a user to download any software to record content, but it also makes access to the recording interface ubiquitous. Regardless of device or operating system, users from virtually any commercially viable system are able to record and upload video that can be transcoded into broadcast quality video files and/or into video files appropriate for Internet distribution. The CCDS can distribute the appropriately transcoded video files (with or without manual production or administrative review) to either television broadcast outlets or Internet distribution outlets using the interface 300. This feature eliminates the need of a professional production team to transcode disparate formats of user-generated video files before the team can compile and review the files for inclusion in live or pre-recorded linear television or other programming. This aspect not only make production less expensive for television or movie production teams, it makes is the process simpler, and therefore more likely that a production team will want to include crowd-sourced content in their programming (e.g., television or movie programming). The broadcast quality requirements may vary, and may be easily adjusted within the CCDS using predetermined automated transcoding workflows, depending on a particular broadcaster or satellite uplink provider, distribution outlet, or on a format required to be able to perform the broadcasting. For example, broadcast quality requirements for a standard definition broadcast may include a particular bit rate, type of codec, minimum pixel resolution, video frame rate, audio quality, and the like. In general, the quality level of the uploaded file may be required to be sufficient to transcode a received Flash® video file or a file in another format into a video file format that complies with broadcast requirements. In other instances when a video file is to be distributed only via the Internet, H.264 format may be sufficient. The following parameters provide one example of the requirements for an SD broadcast:

Omneon Codec: ML@MP CBR
Bit rate: 15 Mb
GOP: IBBPBBPBBPBB
Resolution: 720×480
Frame rate: 29.97 frames-per-second (fps)
Video extension: .mpg
Enable Omneon User Data Creation: true
Preserve source timecode in file headers: true
Save as start timecode in file header: true
Save as first frame in file header: true
Output file type: self-contained
Output file extension: mxf
AIFF audio 4 channels/4 channels per file
24 bit
Video
24 bits per pixel Components of the interface 300 can include controls that enable the user to make various selections, such as a video source section control 302, audio source selection control 304, and an Internet connection speed selection control 306. For example, referring to FIG. 4, video source selection control 302 enables the user to select video recording source. Consequently, if a peripheral camera is connected to a device having a built-in camera, the user can have the option of selecting either the built-in camera or the connected peripheral camera. Additionally, referring to FIG. 5, audio source selection control 304 enables the user to select an audio recording source. Consequently, if a peripheral camera having a microphone or a peripheral microphone is connected, the user can have the option of selecting either the built-in microphone or a connected peripheral microphone. Also, referring to FIG. 6, Internet connection speed control 306 enables the user to select the speed of their Internet connection in order to adjust for uploading digital content files to the CCDS.

Figure 7:
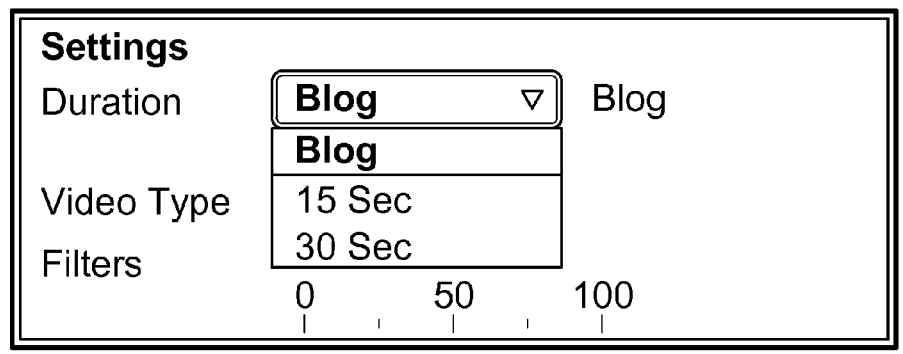
FIG. 7 is an illustration of a duration setting selection control of the web-based recording and uploading user interface of FIG. 3.
Figure 8:
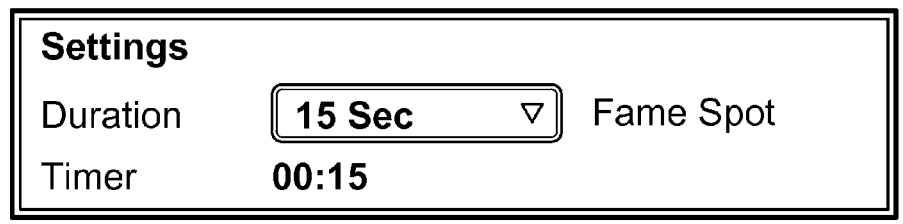
FIG. 8 is an illustration of a famespot timer display of the web-based recording and uploading user interface of FIG. 3.
Figure 9:
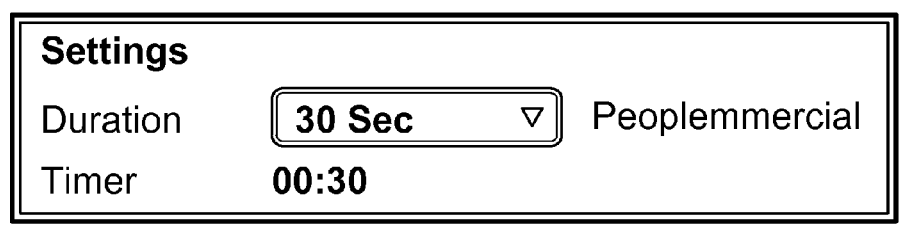
FIG. 9 is an illustration of a peoplemercial timer display of the web-based recording and uploading user interface of FIG. 3.
Figure 10:
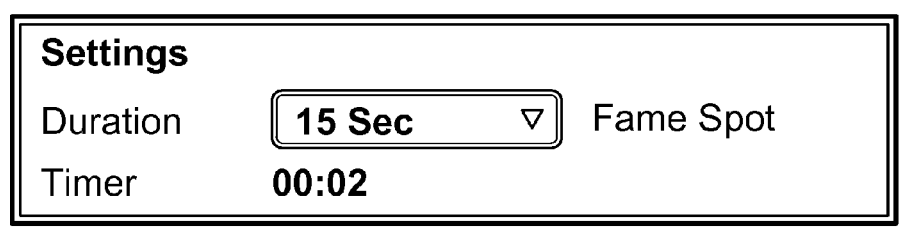
FIG. 10 is another illustration of a famespot timer display of the web-based recording and uploading user interface of FIG. 3.
Figure 11:
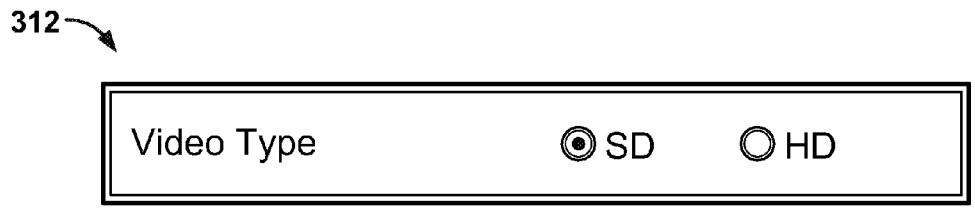
FIG. 11 is an illustration of a video type selection control of the web-based recording and uploading user interface of FIG. 3.

Returning to FIG. 3, a recording duration settings control 308 can be provided. Referring to FIG. 7, recording duration settings control 308 enables the user to pre-select duration of a video to be recorded for submission. For example, options presented for user selection can be 15-second "fame spots", 30-second "peoplemercials", or videos of any longer or lesser duration for video blogs or for inclusion in certain linear television programs. In some implementations, multiple lengths can be added to accommodate various programming formats, and/or video lengths can also be altered by the user. In some implementations, the duration can be specified based on a request for submission of crowd-sourced content. For example, a request can be broadcast at the beginning of a television program or otherwise distributed (e.g., by email or through a web page) to submit videos for potential inclusion in a television program (e.g., later in the same television program broadcast) or other media production. The request can instruct users to visit a particular web page that includes a thin client recording application through which the users can record and submit video and/or other content, and the thin client recording application on that web page can enforce a particular duration to ensure that editing of the video length is not required. Referring to FIG. 8, in some implementations, when the user selects a 15-second option, the user can be presented with a display component having a counter indicating how much time is left until the completion of the recording. Accordingly, the user can see a timer 310 of 15-seconds for a "FameSpot". Referring to FIG. 9, the timer 310 can have 30-seconds when the user selects to record a 30-second "peoplemercial". Referring to FIG. 10, as the user approaches the end of the 15 second or 30-second recording time allocation, the timer 310 can approach 00:00 to let the user know to complete the final portion of the recording.

Figure 12:
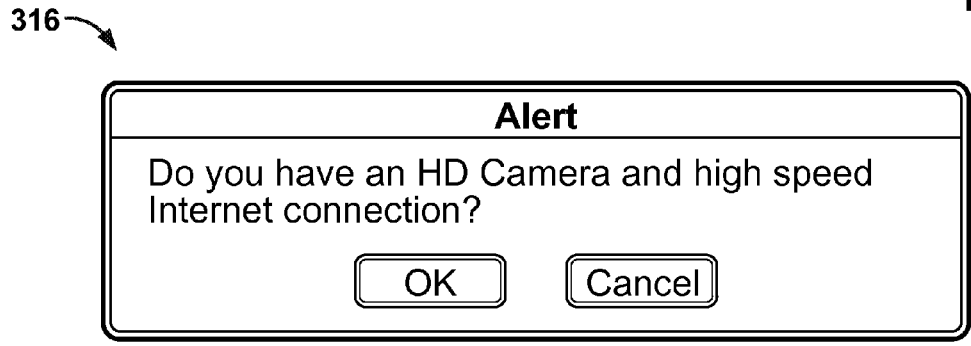
FIG. 12 is an illustration of an HD camera availability confirmation control of the web-based recording and uploading user interface of FIG. 3.
Figure 13:
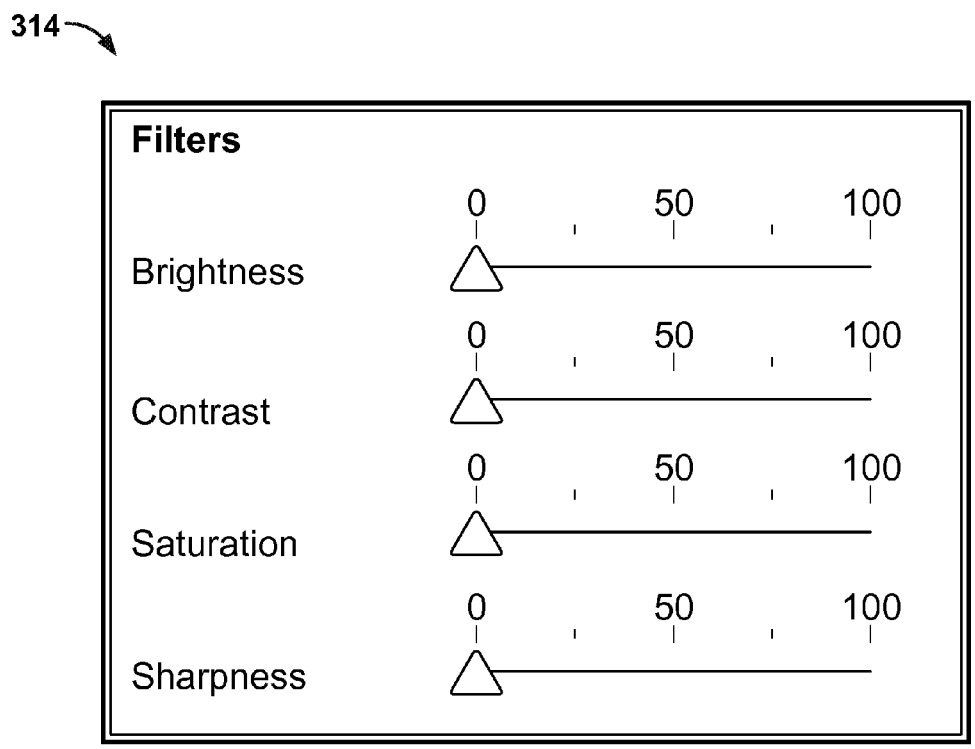
FIG. 13 is an illustration of a video recording filters control of the web-based recording and uploading user interface of FIG. 3.

Returning to FIG. 3, other selection controls can be a video type selection control 312 and video recording filters controls 314. In some implementations, referring to FIG. 11, the video type selection control 312 can offer example options: SD and HD. However, it is envisioned that additional or alternative video type options can be presented. Referring to FIG. 12, if the user selects the HD option, the system can present a query 316 asking the user to confirm the fact that there is an HD camera available for the recording. Additionally, referring to FIG. 13, the video recording filters controls 314 can offer the user the capability to adjust brightness, contrast, saturation, and/or sharpness of the picture generated by their built-in or connected peripheral camera.

Figure 14:
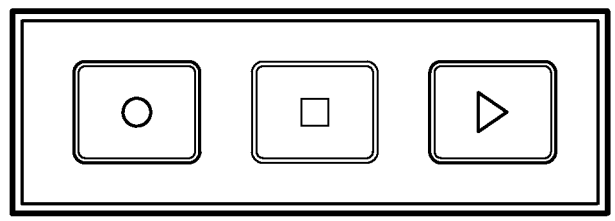
FIG. 14 is an illustration of a video recording controls of the web-based recording and uploading user interface of FIG. 3.
Figure 15:
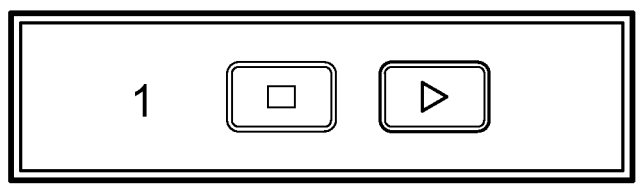
FIG. 15 is an illustration of a recording countdown display of the web-based recording and uploading user interface of FIG. 3.

Returning to FIG. 3, another control of the interface 300 can be video recording controls 318. Referring to FIG. 14, the recording controls can operate in an intuitive manner for most users. For example, a far-left button with a red dot in the middle can be provided as a record button. Also, a middle button with a square can be a stop button, and a button all the way to the right with a triangle can be a play button. However, referring to FIG. 15, a recording countdown display 320 can also be provided. For example, once a user "clicks" the record button, the user can be given a count-down from 3-2-1 (e.g., in red numbers) to let the user know when the recording will begin. As already detailed above, while the recording is taking place, a separate counter (e.g., for famespots, peoplemercials or social clips) can count down from the appropriate starting point (e.g., 15 seconds, 30 seconds, or other lengths respectively).

With regard to recording, and as introduced above, implementations of the present invention enable web-based recording to generate video content using a thin client Flash® recorder executed on a computing device that communicates with one or more back-end servers. In some implementations, the thin client Flash® recorder is downloaded to the client computing device as part of a web page of a website that is hosted using the one or more back-end servers. Scripts within the web page provide the functionality of implementing the various recording controls discussed above with reference to FIGS. 3-15.

Video data can be generated using a local video camera through an associated API. The video data can include both image data and audio data. The client-side recorder ensures that the video data is of sufficient quality for broadcast purposes, which can require very high quality, or for web video blogs, for example, which can be achieved using a lower quality level. In some implementations, the client-side recorder can notify the user whether the equipment (e.g., camera) or recording settings are adequate for broadcast video. In some implementations, the client-based recorder ensures that sufficient video data is encoded within the subsequent video file.

Using the system of FIGS. 1 and 2, during recording, and as the video camera generates video data, the video data can be cached and transmitted to the one or more back-end servers. The web-based recorder captures and caches sufficient video data to retain broadcast quality requirements and transmits the video data to the one or more back-end servers in quasi-real time. More specifically, as video data is generated, the video data is cached and a predetermined amount of video data is intermittently transmitted from the client computing device to the one or more back-end servers. The pre-determined amount of video data that is transmitted can be determined based on the available transmission bandwidth instead of, for example, adapting image quality to meet limited bandwidth availability. Upon receiving the video data at the one or more back-end servers, a corresponding video file is generated and is stored. The video file can be in the FLV format and can include any video data necessary to meet quality requirements. By caching and streaming the video data from the client computing device to the one or more back-end servers, the compression and transmission of a complete video file from the client computing device to the back-end servers is avoided. In this manner, data loss that can occur through conventional compression technologies is avoided.

As discussed herein, when using web-based recording, the video file can be sent from a computing device in the FLV format. In some implementations, a pre-recorded video file can alternatively be uploaded to the one or more back-end servers (e.g., from a computing device). Such pre-recorded video files can be provided in the FLV format, the MOV format (e.g., from a computing device that does not support Flash®), or another format. The video file can be transcoded to a format that is appropriate for a designated downstream use. In some implementations, the video file can be provided to a server, which transcodes the video file to a desired format. Once stored to the server, the server immediately transcodes the video file using ffmpeg modifications and library additions to ensure quality retention and synchronization to provide a video file (e.g., in MP4 format) that meets quality specifications. By way of non-limiting example, upon completion of a web-based recording, the resultant video file in FLV format can be provided to a file server that immediately transcodes (e.g., using FlipFactory™ video transcoding software) the video file into one or more other formats (e.g., MOV and MP4; from MP4 to MXF, and/or directly from FLV to MXF). Generally, MOV, MP4, and H.264 are common Internet formats, while MXF or MV4 can be used for broadcast television. In some implementations, video file format transcoding can be based on the user profile. For example, if the user that created or submitted the video file is registered for video blogs, for broadcast television, or both, the underlying video file can be transcoded into the appropriate formats and delivered to both destinations.

An image file is generated and can be provided in JPEG format or another appropriate image file format. The image file is used as a thumbnail image representing the video file. A frame from the beginning of the video can be selected using the ffmpeg extension for the PHP scripting language. GIF draw (GD) can be used to create the image from the selected frame. Another script can be executed to determine whether the video is oriented correctly. If it is determined that the video is not correctly oriented, the video file can be processed to correctly orient the video.

Figure 16:
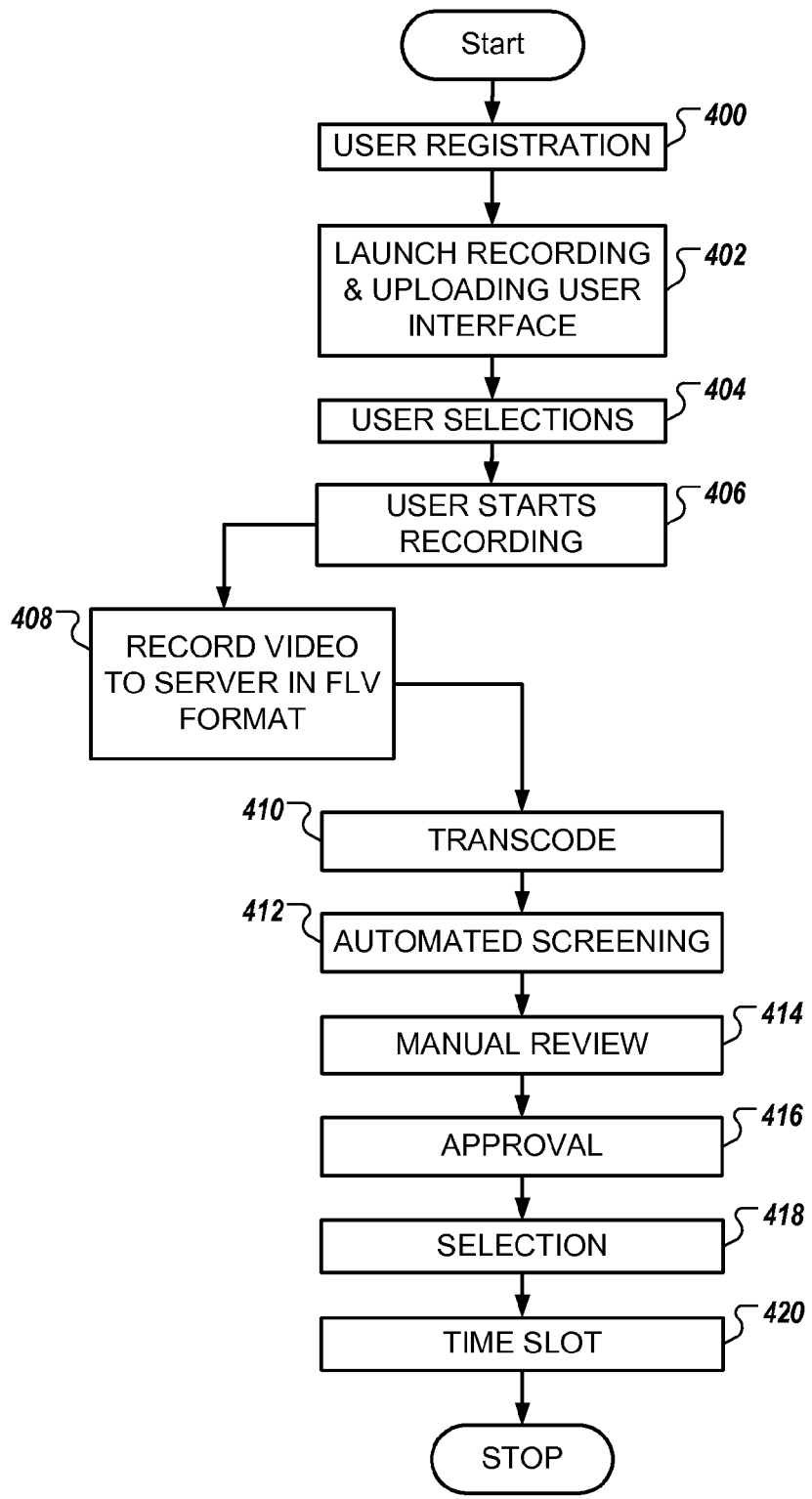
FIG. 16 is a flow diagram representing certain steps of a computer-implemented process for a system for recording and submitting broadcast quality digital video from a computer.

Referring now to FIG. 16, an example web-based method of recording and providing broadcast quality digital video content (e.g., in the form of "famespots", "peoplemercials", or social clips) from a client computer will be discussed. A user registers at a website hosting the CCDS client application (400). The user can open/launch a recording and uploading user interface (RUUI) (402), as described above with reference to FIGS. 3-15. Using the interface, the user can make various selections (404). As discussed above, user selections can include one or more of camera source, audio source, Internet connection, duration of recording (blog, 15-second "famespot", 30-second "peoplemercial", social spot, video blog, etc.), video type (e.g., SD, HD, etc.), and video filter adjustments. The user can activate video recording buttons of the interface, to initiate video recording and creation of a corresponding digital video file (406).

The digital video can be recorded in Flash® format (i.e., FLV format) using a Flash® server (e.g., server 202 of FIG. 2) (408). Other formats (e.g., capable of providing streaming video data) other than the FLV format (e.g., silverlight, SVG, etc.) can be implemented. In particular, and in the case of recording through a website, the website receives video and audio from the selected input devices through a communication interface on the user computer, and scripts provided in the retrieved web page encode the video in FLV format in accordance with quality parameters. Example quality parameters can include frame rate, resolution, aspect ratio, stereo at 48 kHz sampling, audio and video bit rate, which are deemed to be of sufficient quality for broadcast purposes. By way of non-limiting example, the flash recorder of the interface can record in HD at a frame rate of 30 fps (or, in some cases, 29.97 fps) and at a bit-rate of 15 mega-bits per second, which is of higher quality than conventional Flash® recording. That is, the recorder provided by the interface records in accordance with parameters that enable the FLV file to be transcoded into a video file that meets specific quality parameters for a selected type of distribution destination. The scripts are executed to cache and transmit the FLV video. For example, the video data can be placed in a cache, or otherwise buffered, and can be transmitted from the cache based on available bandwidth. As another example, the video data can be cached and transmitted only when the available bandwidth is insufficient to keep up with a required bit rate).

The video file can be transcoded (410) and submitted to an automated screening process (412). The video file can be transcoded into multiple file formats in parallel or nearly in parallel. For example, the video file can be transcoded into one or more Internet formats (e.g., MOV, MP4) and into one or more television formats (e.g., MXF). Generally, although not necessarily, the video file can be submitted to the automated screening process in a transcoded format, rather than in, e.g., the FLV format. For example, the video file can be processed and can be transcoded to another video format (e.g., MOV, MP4) prior to submission to the automated screening process. As discussed herein, the automated screening process can pre-screen the video file and can flag frames within the video that may require additional scrutiny. The pre-screened video file is made available for manual review by administrators (414). As discussed in further detail herein, an administrator can employ an administrative user interface (see FIG. 17) to access the pre-screened video files on web hosting server 206 (see FIG. 2) for manual review and approval (416). Approved videos can enter a selection process (418) for integration into a linear programming schedule. Thus, videos can be reviewed (automated and/or manual review) in one or more formats and, if selected for integration into a linear programming schedule, the corresponding video in an appropriate television format can be sent, marked for retrieval, or otherwise identified for inclusion in the linear programming schedule. Accordingly, by transcoding video in parallel or near parallel (e.g., during an at least partially overlapping time period, or transcoding into an appropriate television format while the video is undergoing automated and/or manual review), the video in a format appropriate for television can be ready for integration into the linear programming schedule immediately or nearly immediately after selection. In some implementations, the selection process can further include an auction process. If, as determined during the selection process, the video is to be broadcast (e.g., on a television channel), a time slot is assigned (420), and the video is broadcast at the assigned time slot. In some implementations, the selection process can include an administrator selecting and scheduling video broadcasts.

In some implementations, an administrator can select the video and assign the video to a particular slot in a linear programming schedule using, for example, the review and authorization interface 134 of FIG. 1. For example, the administrator can provide the video file as corresponding to a previously provided program name that is assigned to a specific time slot. As another example, the administrator can inform a traffic server of the video file name and assigned time and provide the video file to a traffic server (e.g., the traffic server 224 of FIG. 2). To this end, the interface can be used to display the linear programming schedule to the administrator, and the administrator can manually interface with the traffic and program servers to insert programs into the linear programming schedule. In some implementations, the administration process can automatically interface with the traffic and program servers to dynamically insert programs into the linear programming schedule. For example, the video file can be stored on traffic server 224 (see FIG. 2) for integration with linear programming sent to broadcast server 226 (see FIG. 2) prior to being sent out over a cable and/or satellite distribution network.

Figure 17A:
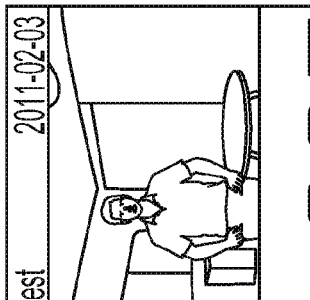
FIGS. 17A-C are example screen-shots of an administrative interface for reviewing, authorizing, or declining certain video files.
Figure 17B:
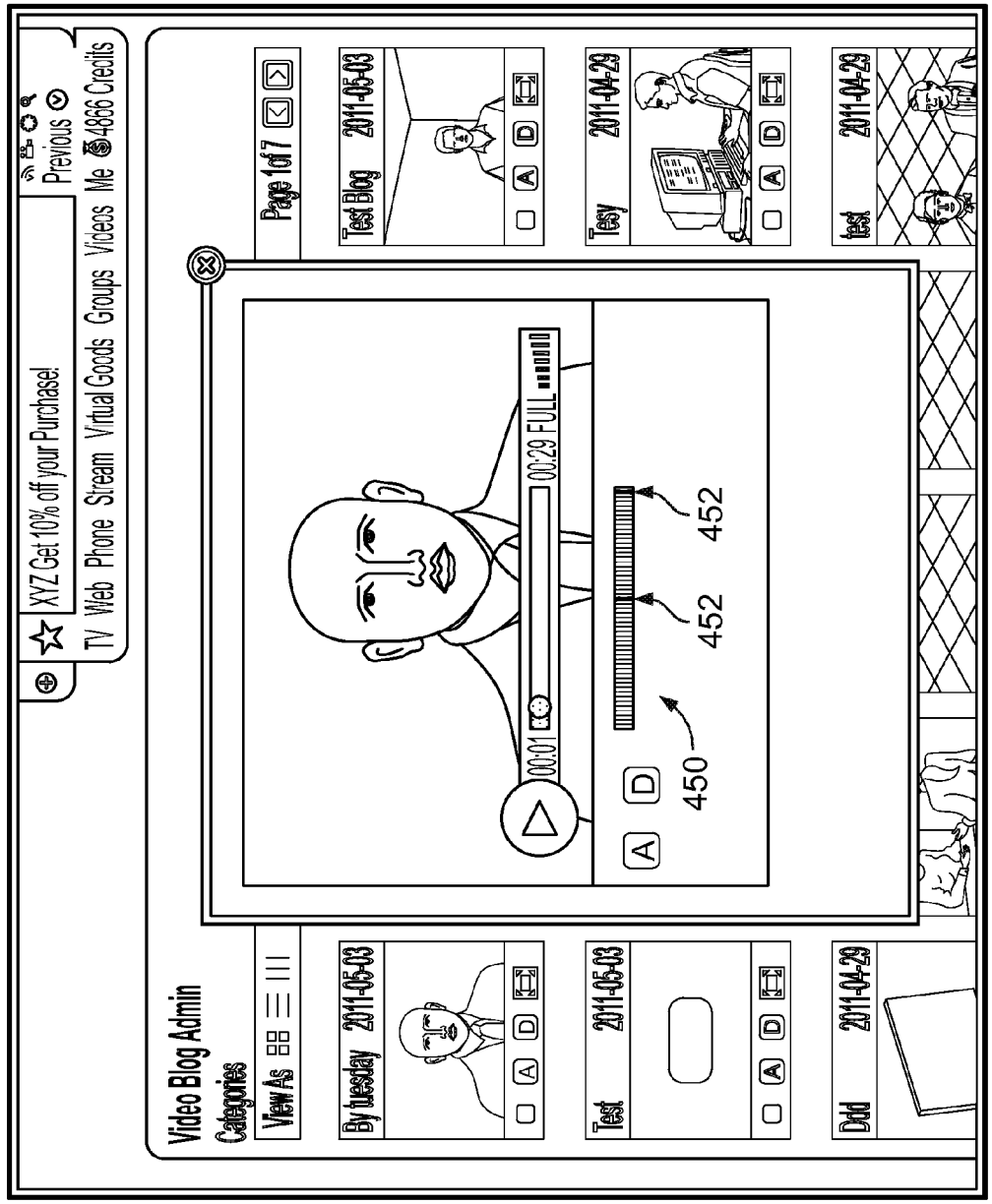
Figure 17C:
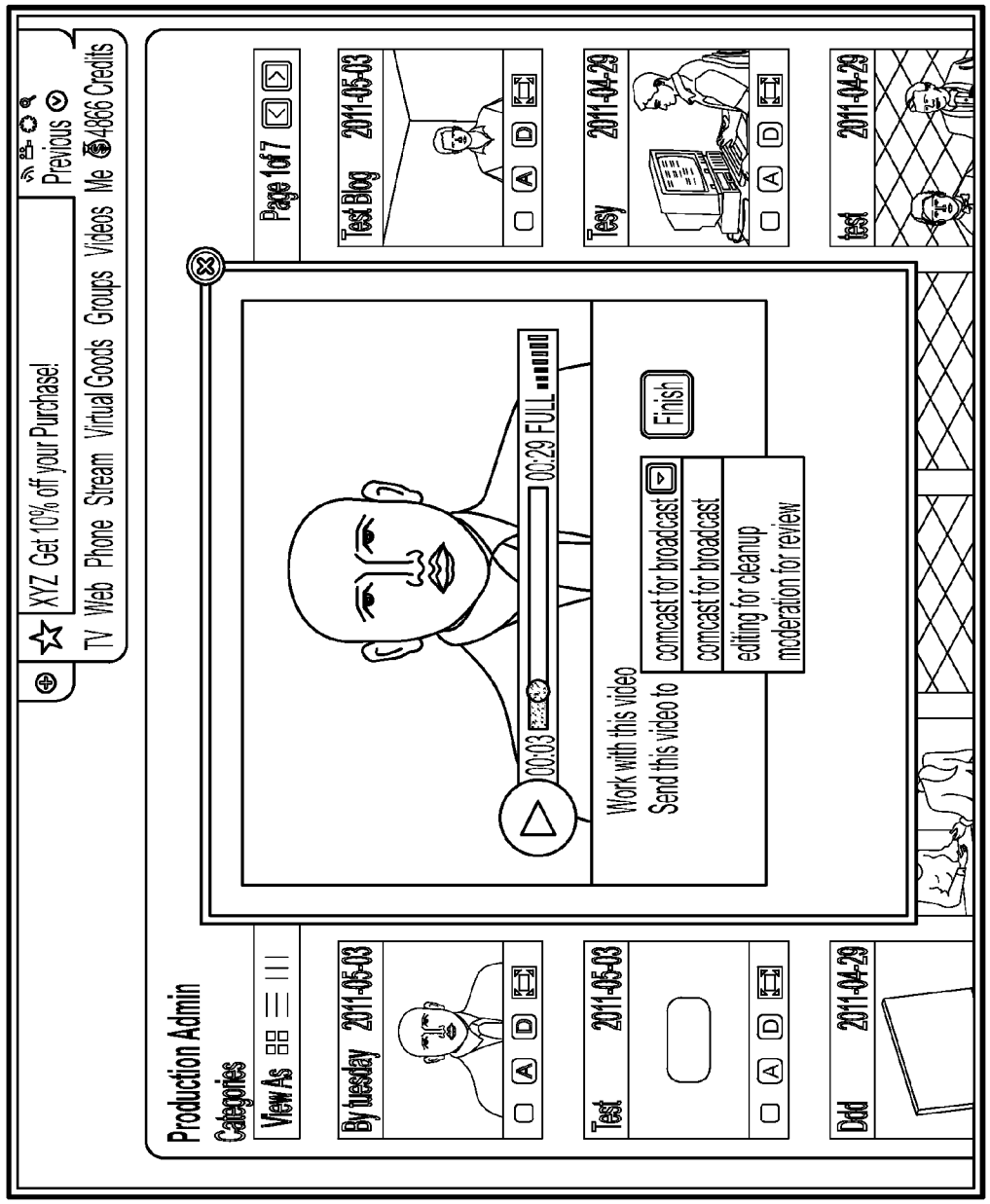

Referring now to FIGS. 17A-17C, the administrator interface will be discussed in further detail. The administrator interface enables an administrator to participate in a review process to review, authorize, or decline certain video files. As shown in FIG. 17A, the administrator interface can enable an administrator to view and select one or more thumbnails corresponding to different videos that are available for review. The videos can be selected based on a filter that corresponds to the content and the particular administrator's review responsibility, as discussed above. The administrator interface can be used to select which videos to manually review (e.g., sequentially, in any selected order, or using filters as discussed above, for identifying particular videos for inclusion in a program).

In some implementations, the review process can include sending a video file to a third-party service that processes the video file and that flags questionable content. For example, the third-party service can execute software that automatically compares one or more frames of the video to a database of suspect or questionable images. If a frame of the video sufficiently matches an image in the database, metadata can be generated that annotates the video file to flag the suspect frame and an annotated video file can be provided to the administrator for manual review. In some implementations, the third-party service provides a list of frame identifiers (IDs) that correspond to flagged frames. In some implementations, the third-party service provider can generate and provide a thumbnail image of each flagged frame. The frame ID and/or corresponding thumbnail image can be presented on the administrator interface. In some implementations, by selecting one of the thumbnails, the video can be presented on the administrator interface as shown in FIG. 17B with a representation of a playback line 450 that corresponds to the length of the video can be displayed and can include markers 452 indicating the location within the video of one or more frames flagged as having suspect or questionable content.

As shown in FIG. 17C, the administrator can designate selected videos to be sent for broadcast, for editing (e.g., using Avid® video editing software or Final Cut Pro® video editing software), or for further review. The administrator can, for example, select from a drop down menu of particular destinations (e.g., ftp servers associated with a particular destination or additional processing workflow) and/or define additional destinations for the selected videos. In some implementations, as discussed above, the administrator interface displays a linear programming schedule and can highlight open slots, or slots that have been assigned to a placeholder name but that do not have a video assigned thereto. Using the administrator interface, the administrator can manually assign a selected video file with a specific time slot.

Figure 18:
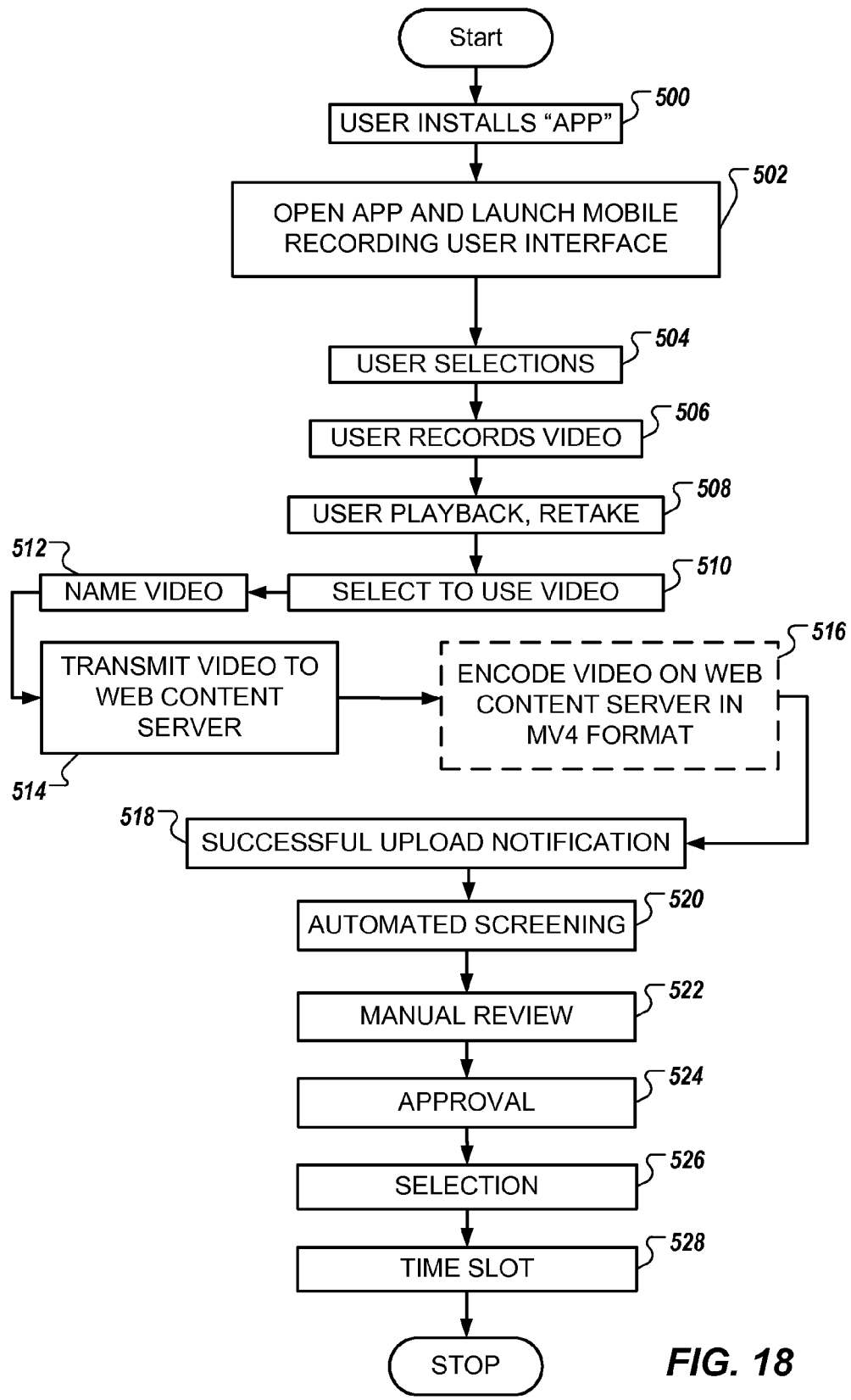
FIG. 18 is a flow diagram representing certain steps of a computer-implemented process for a system for recording and submitting "broadcast quality" video files such as famespots, peoplemercials, or video blogs from a smart phone, computer tablet, or other mobile device.
Figure 20:
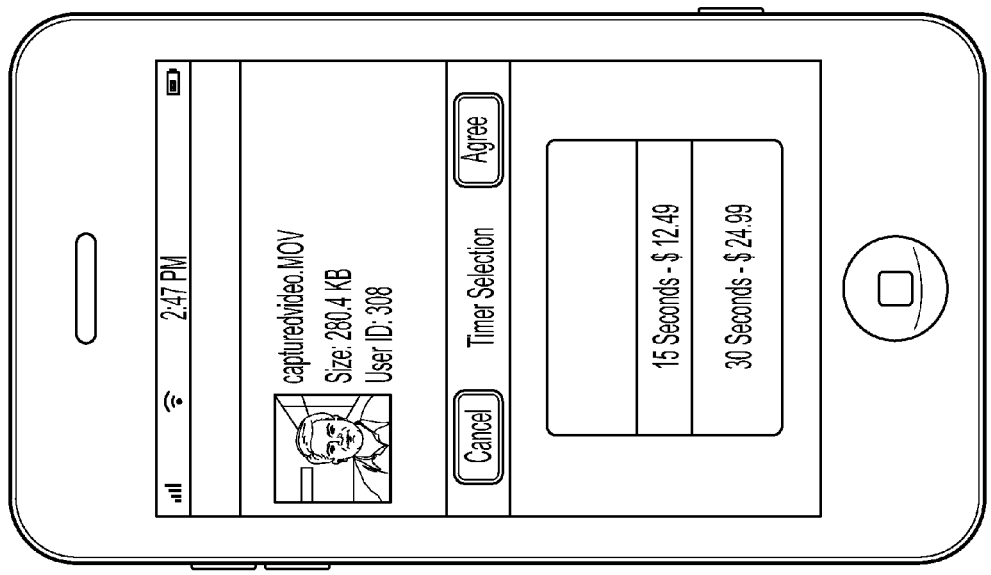
FIG. 20 is an example of the mobile recording user interface in a duration selection mode of operation.
Figure 19:
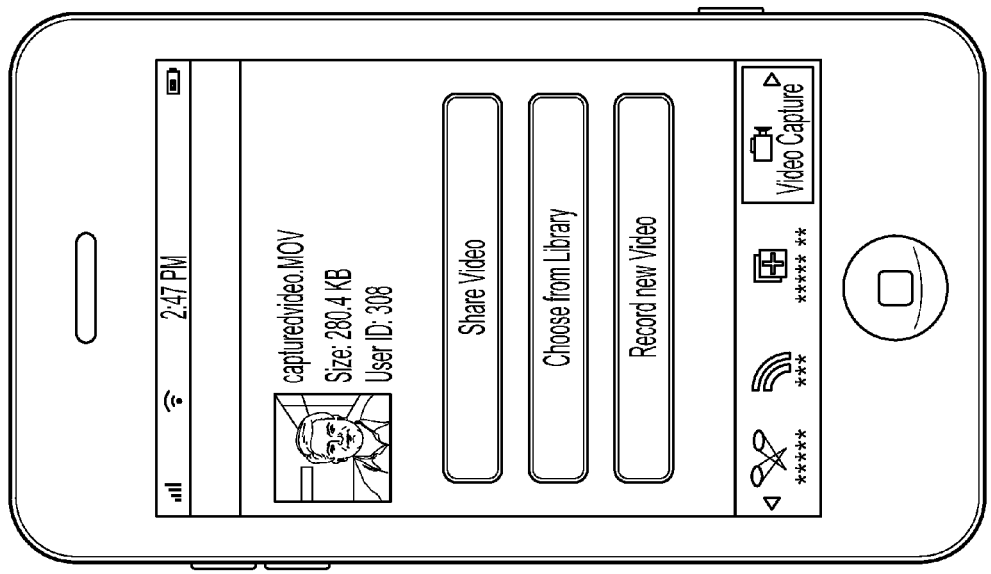
FIG. 19 is an example of a mobile recording user interface (MRUI) in an options presentation mode of operation.
Figure 21:
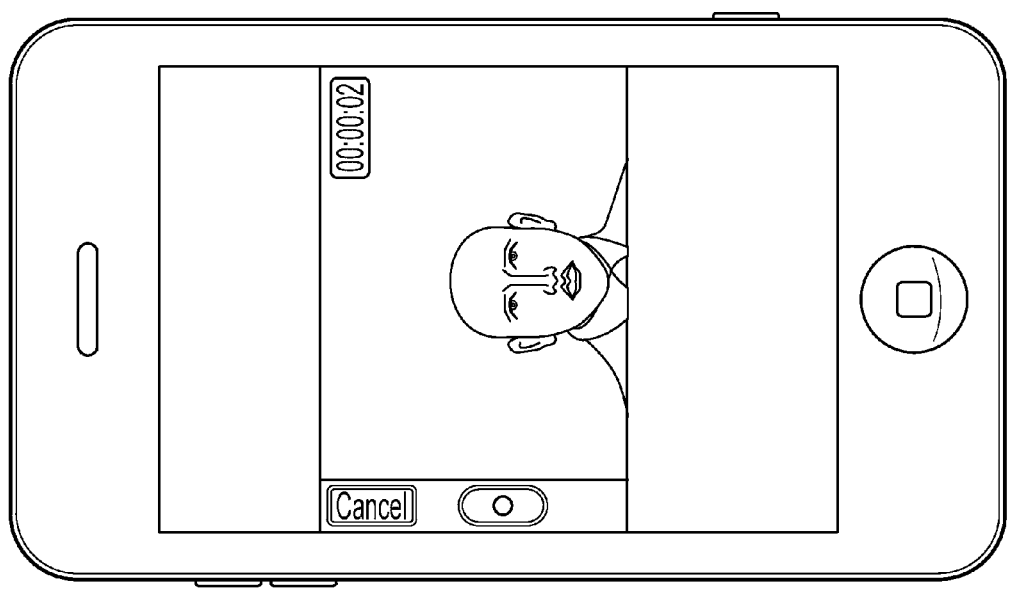
FIG. 21 is an example of the mobile recording user interface in a recording mode of operation.

Referring now to FIG. 18, a method of recording and submitting broadcast quality video files from a smart phone or mobile device can begin with a user downloading and installing a mobile application (e.g., on a computing device) (500). The mobile application can be opened and the user can log into the mobile application using pre-defined credentials. A mobile recording user interface (MRUI) is launched (502) by, for example, selecting a video capture button on a bottom-right-hand corner of the user interface (see FIG. 19). A "Record New Video" option (see FIG. 19) can be selected (504), and the user can be presented with recording options. Example recording options can include recording a 15 second video file known, for example, as a "famespot" or a 30 second video file, for example, known as a "peoplemercial" (see FIG. 20). The duration of the video file can be used to determine its positioning in linear TV programming. Upon completing these selections, a new recording interface can open that can be employed to record a video (506). In particular, the user can initiate recording of a video by pressing, for example, a red record button, and a countdown timer can be displayed, for example, in an upper-right hand corner that counts down remaining time (see FIG. 21).

Figure 22:
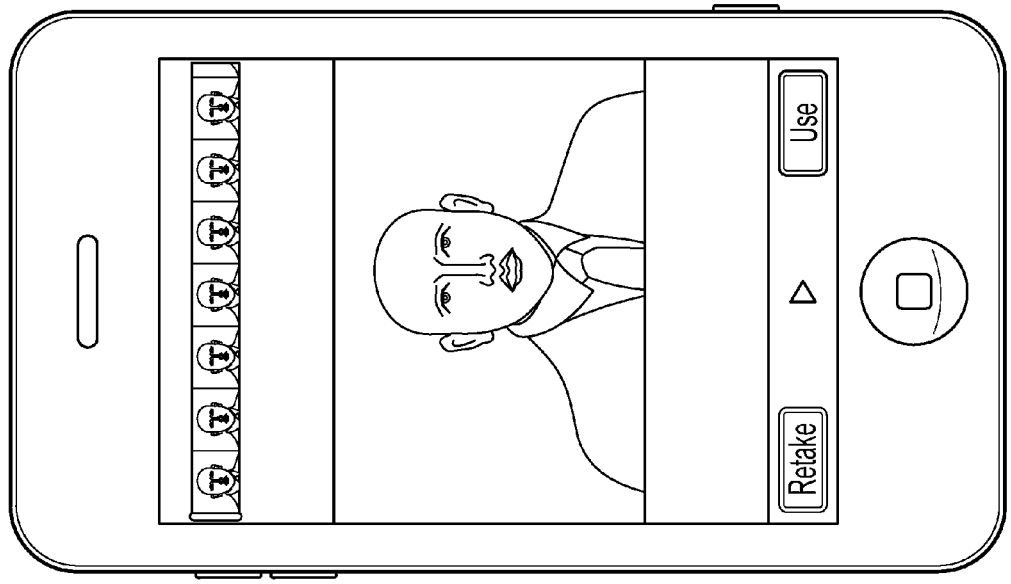
FIG. 22 is an example of the mobile recording user interface in a playback mode of operation.
Figure 24:
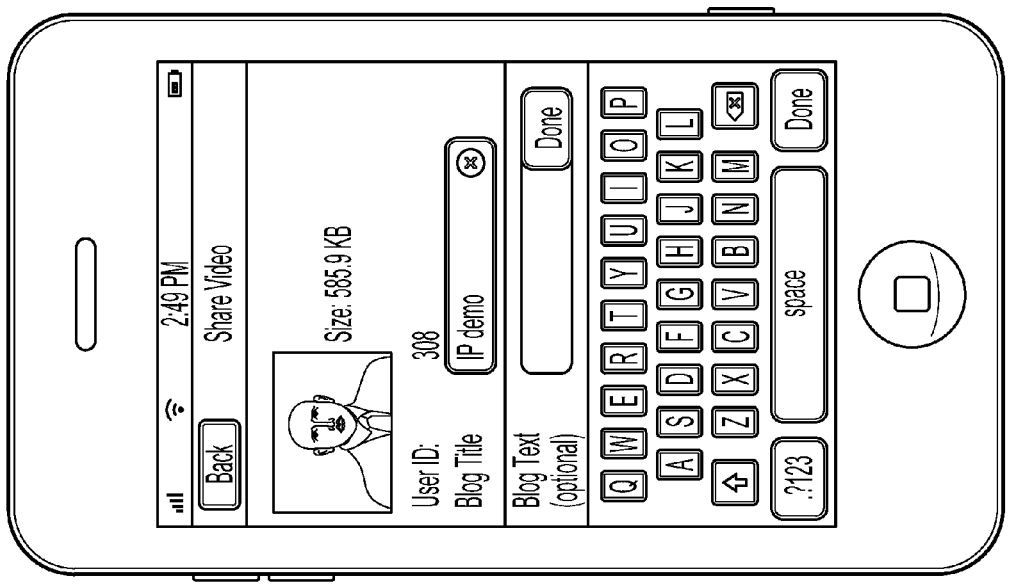
FIG. 24 is an example of the mobile recording user interface in a file naming mode of operation.
Figure 23:
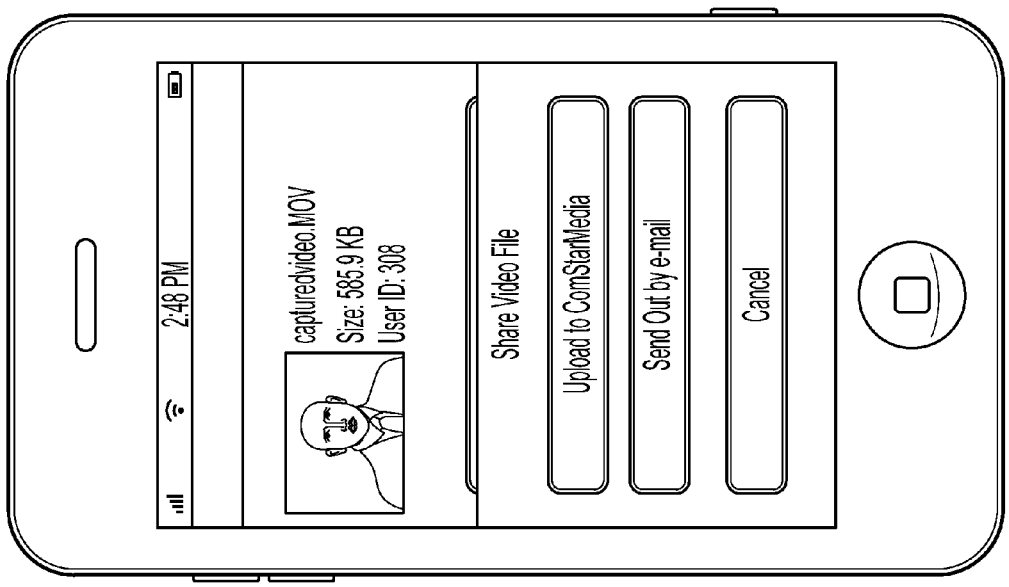
FIG. 23 is an example of the mobile recording user interface in an uploading mode of operation.
Figure 25:
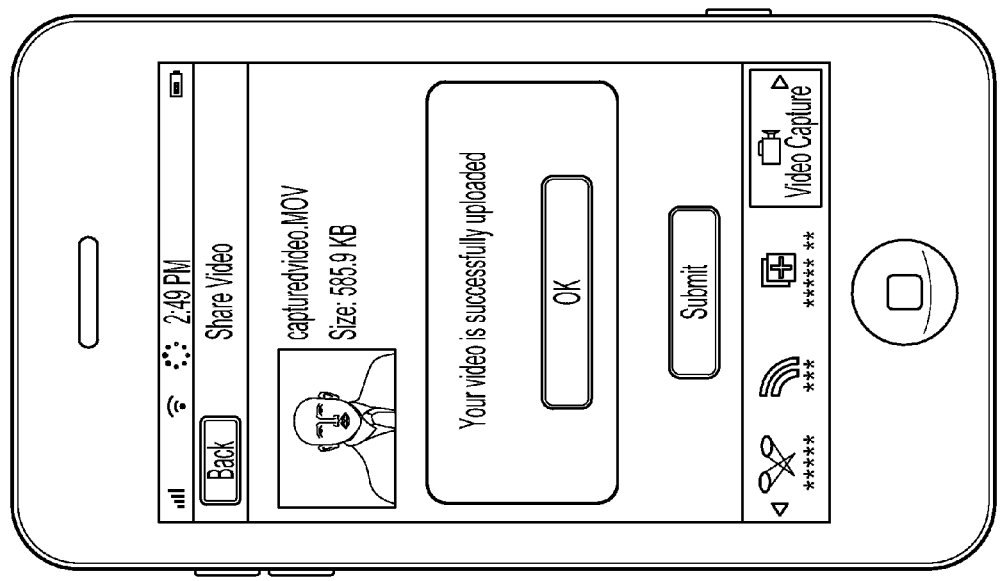
FIG. 25 is an example of the mobile recording user interface in a file submitting mode of operation.
Figure 26:
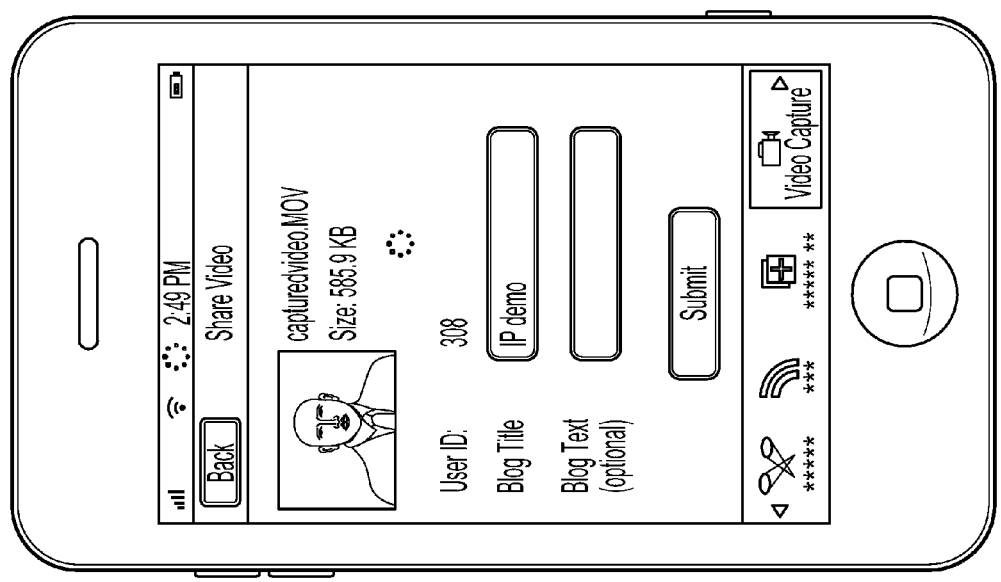
FIG. 26 is an example of the mobile recording user interface in an upload success notification mode of operation.

The recorded video can be played back, and the "retake" or "use" the video (see FIG. 22) can be selected (508). If the user selects to use the video, then a new option can appear to allow the user to upload the video (510) to the CCDS (see FIG. 23). When upload is selected, a video name can be input (see FIG. 24) (512). Upon selecting to submit the video (see FIG. 25), the video file can be transmitted (514) from the mobile device to a web content server 210 (see FIG. 2). At least some mobile devices do not support FLV format, so the video file can be stored on the mobile device in a format supported by the device (e.g., MOV format) and transmitted to the web content server in that same format. Depending upon the final destination of the video (e.g., television broadcast, Internet broadcast), the video file can be immediately transcoded into one or more other formats another format (e.g., MV4 and MXF video files) on the web content server 210 (516). It is envisioned that additional or alternative formats will be readily apparent to one skilled in the art. Once the files have been saved on the web content server 210, the user can be notified (518) that the upload was successful (see FIG. 26). In some implementations, transcoding can be performed or at least initiated simultaneously with, or even before, notifying the user of the successful upload. Thereafter, the video can be submitted for automated screening (520), manual review (522), authorization (524), selection (526), and time slot assignment (528), as similarly discussed above with reference to FIG. 16.

Figure 27:
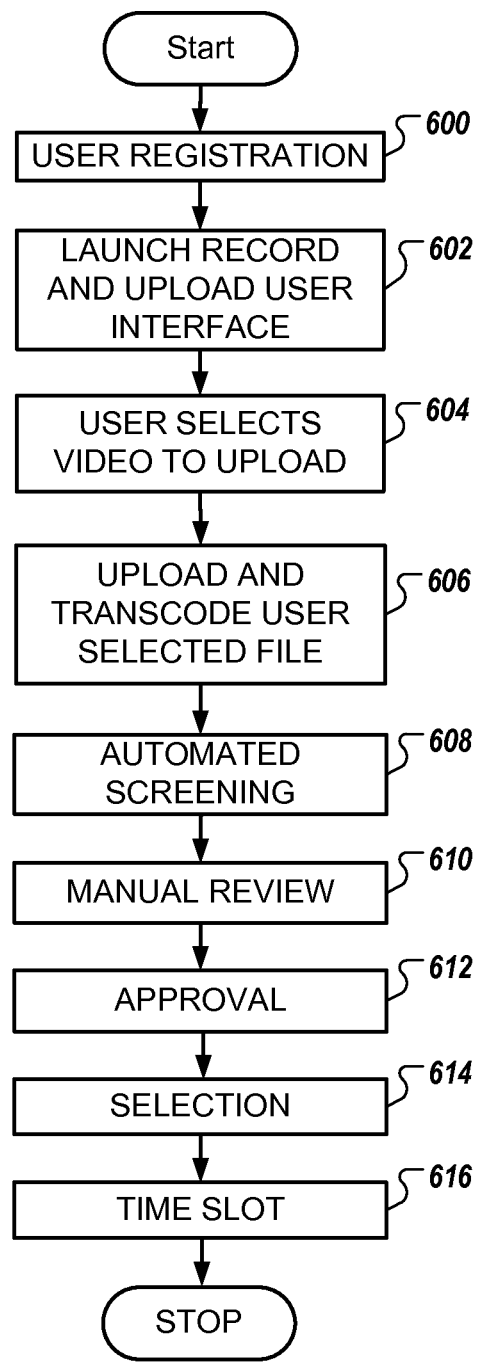
FIG. 27 is a flow diagram representing certain steps of a computer-implemented process for a system for uploading pre-recorded broadcast quality digital video from a computer.
Figure 28:
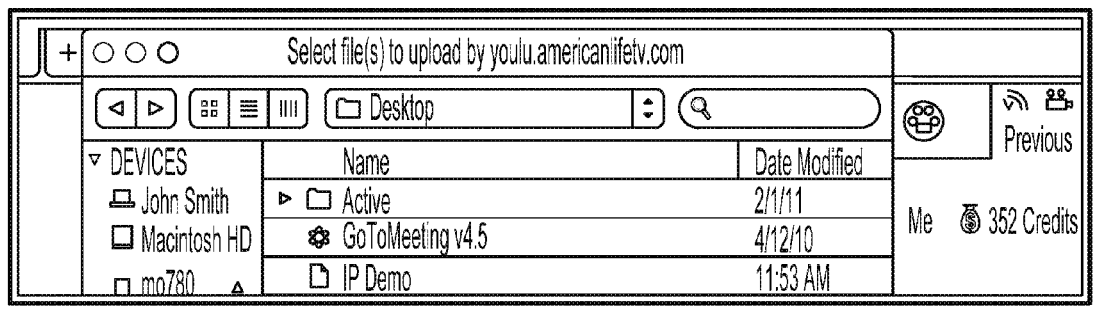
FIG. 28 is an example of a video file browsing utility of the web-based recording and uploading user interface of FIG. 3.

Referring now to FIG. 27, a method of uploading pre-recorded broadcast quality digital video content (e.g., "famespots", "peoplemercials", ) from a computing device can begin with a user registering at a website hosting the CCDS (600). A recording and uploading user interface (RUUI) can be opened and launched (602), as similarly described above with reference to FIGS. 3-15. A video file can be selected for upload (604) through user interaction with a "Browse" button 322 (see FIG. 3). In response, the UI software can automatically open a window to enable the user to find a video file on the local computing device (see FIG. 28). The user can select a video file for distribution and broadcast (604). The video file is uploaded (606) and the CCDS can detect the video file format. In some implementations, and depending on the destination of the video file (e.g., for television broadcast), the transcoding server 214 can transcode the video file to MXF television broadcasting format and can save the transcoded video file to television content server 216. The video can be submitted for automated screening (608), manual review (610), authorization (612), selection (614), and time slot assignment (616), as similarly described above with reference to FIG. 16.

Figure 30:
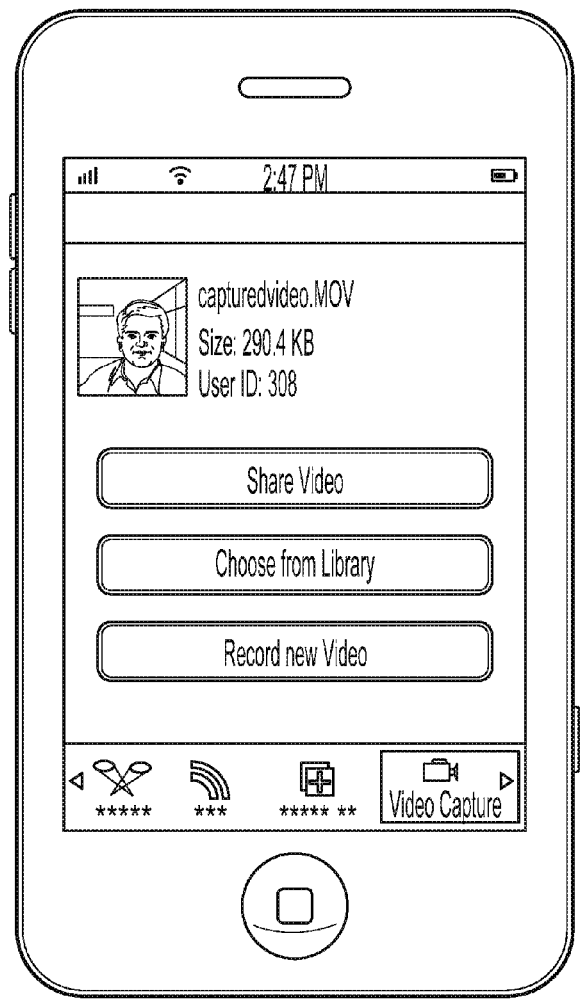
FIG. 30 is an example of the mobile recording user interface in the options presentation mode of operation.
Figure 29:
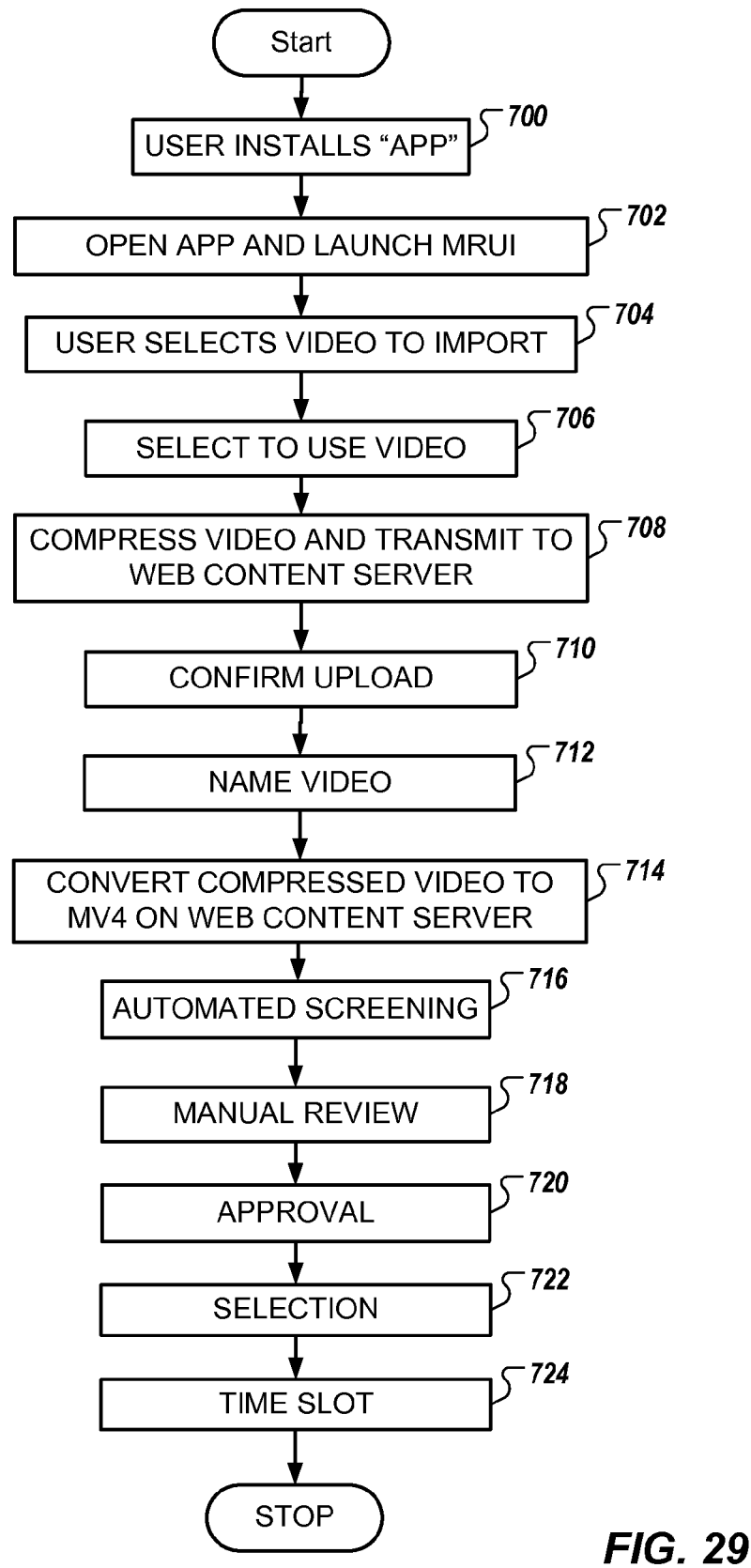
FIG. 29 is a flow diagram representing certain steps of a computer-implemented process for a system for uploading pre-recorded broadcast quality digital video from a mobile device.
Figure 32:
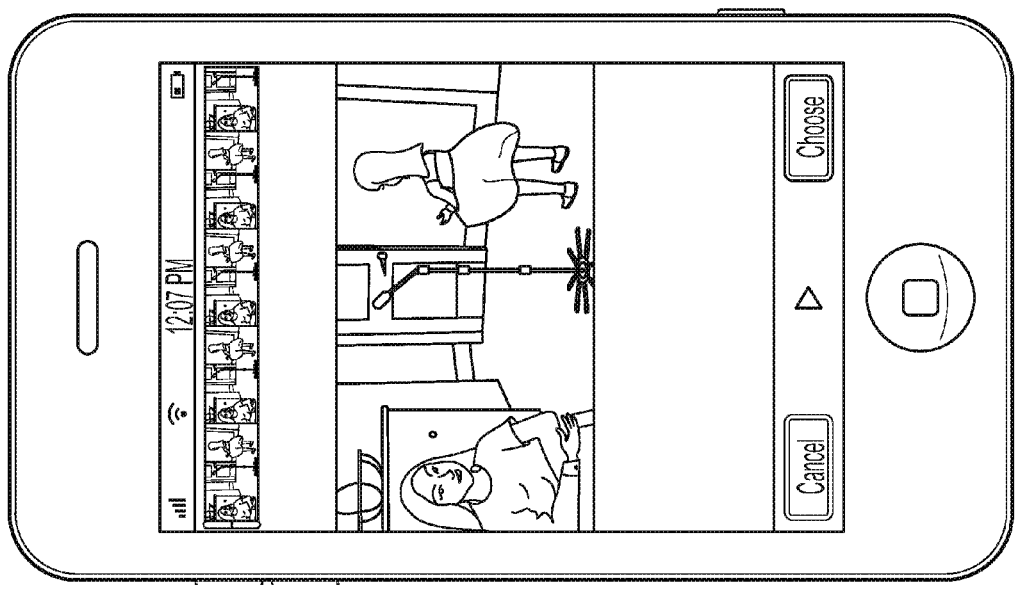
FIG. 32 is an example of the mobile device in a file playback mode of operation.
Figure 31:
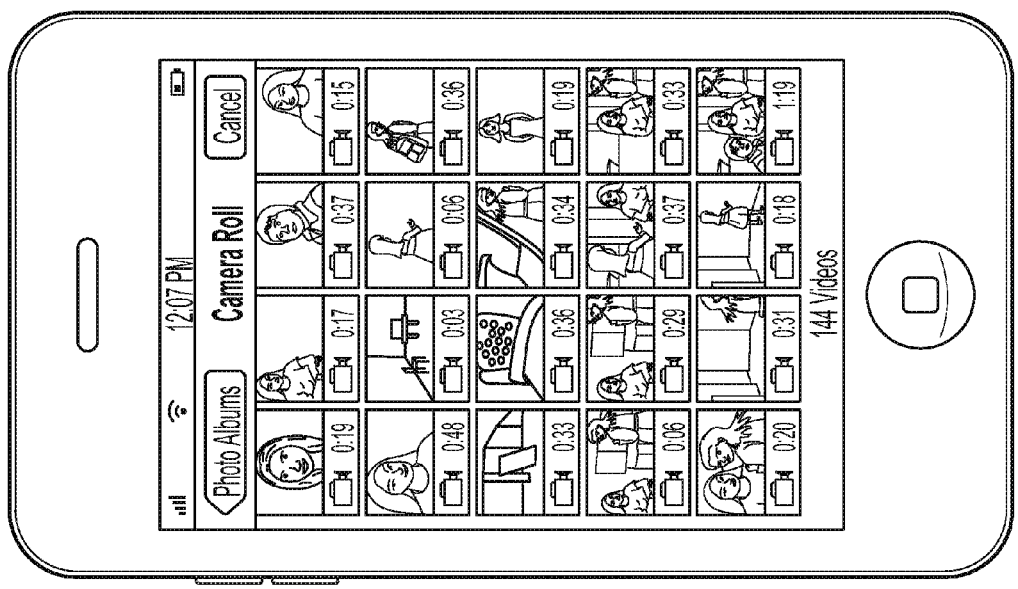
FIG. 31 is an example of the mobile recording user interface in a video file browsing mode of operation on the user device's internal video file library.
Figure 34:
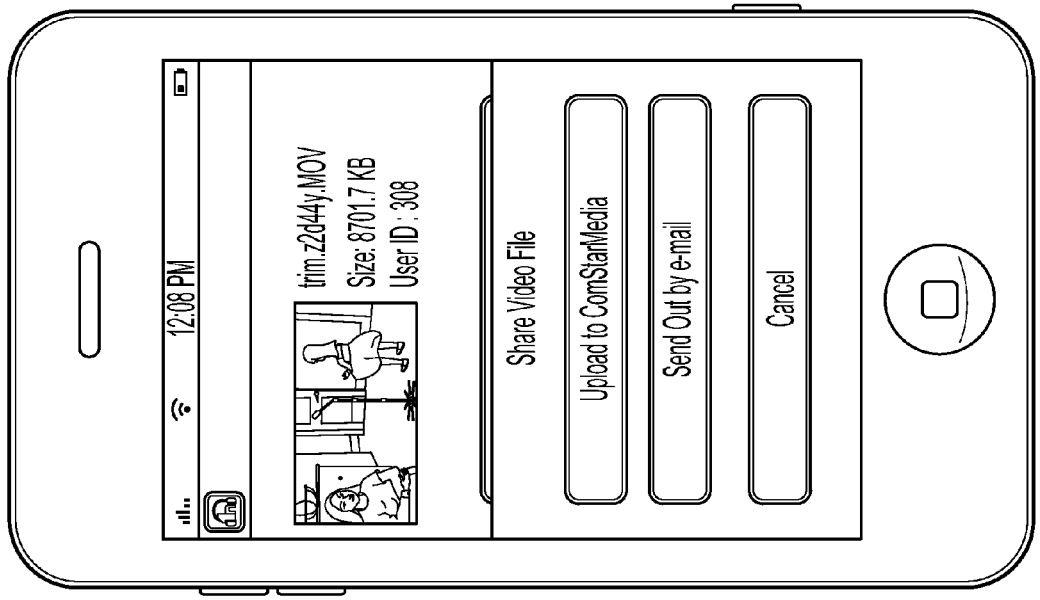
FIG. 34 is an example of the mobile device in a video file upload mode of operation.
Figure 33:
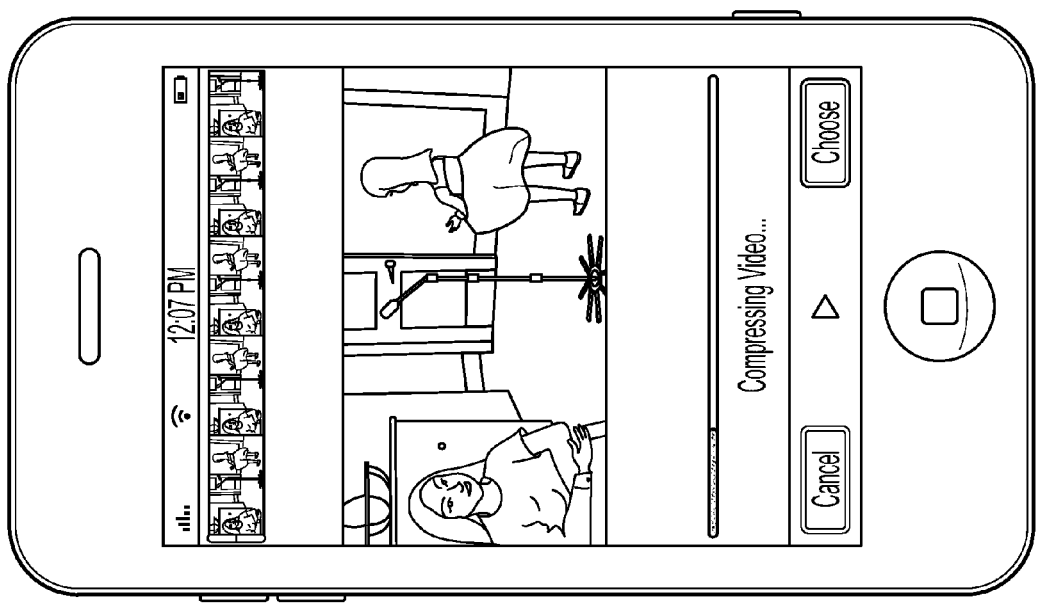
FIG. 33 is an example of the mobile device in a video file compression mode of operation after the file is selected for uploading.
Figure 36:
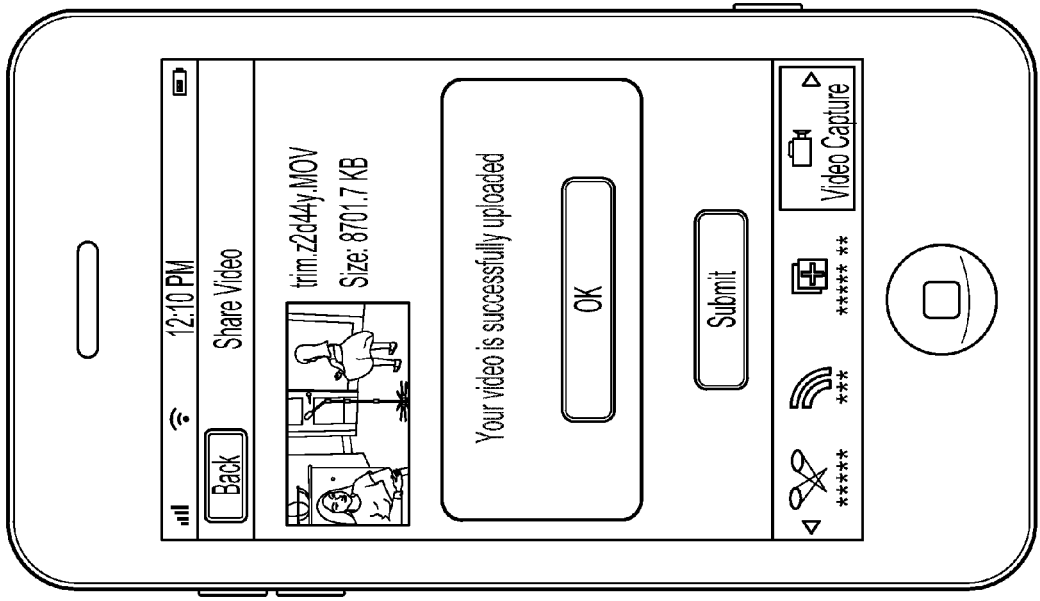
FIG. 36 is an example of the mobile recording user interface in an upload success notification mode of operation.
Figure 35:
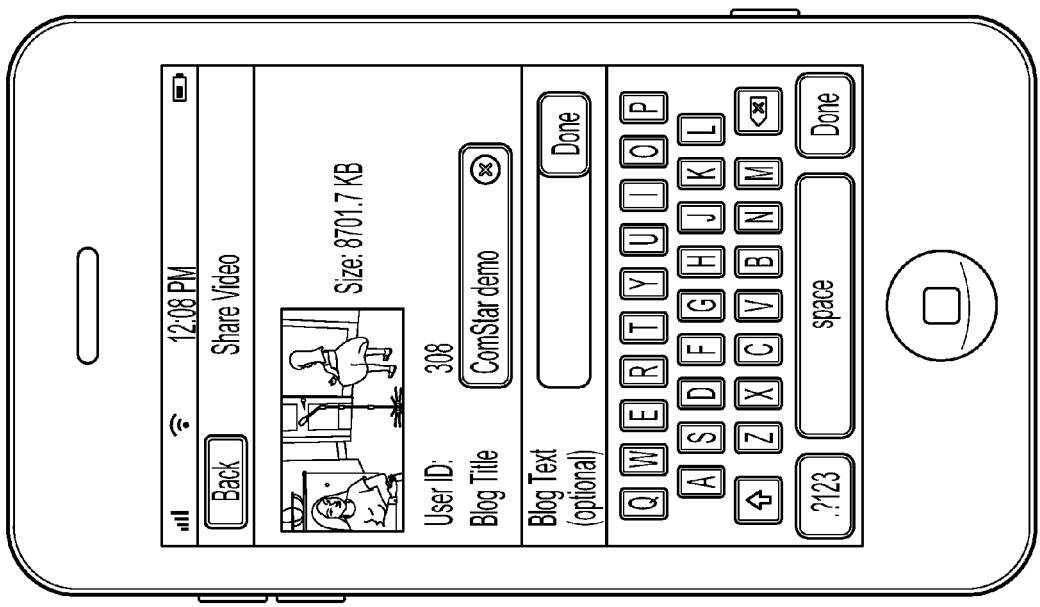
FIG. 35 is an example of the mobile device in a video file naming mode of operation.

Referring now to FIG. 29, a method of uploading pre-recorded broadcast quality digital video (e.g., "famespots", "peoplemercials") from a mobile computing device can begin with a user installing a mobile application (700). The mobile application can be launched and a mobile recording user interface (MRUI) can be opened (702) by, for example, selecting a video capture button on a bottom-right-hand corner of the mobile application (see FIG. 30). A plurality of digital videos can be accessed for selection of a digital video (704). For example, a "Choose from Library" option can be used to access a library of stored digital video files (see FIG. 31). A digital video can be selected (706), and the video file can be imported to the mobile application. In some implementations, the user can play the video to confirm that it is the desired video file, and cancel and select another digital video file, or "Choose" to upload the file (see FIG. 32). In response to selecting a particular digital video file for upload, the selected digital video file can be compressed and transmitted (708) to a web content server 210 (see FIG. 33) so that the digital video file can be stored on web content server 210. Once the file compression is complete, the user can confirm upload to the CCDS (710) (see FIG. 34), and assign a name to the video file (712) if the upload option was selected (see FIG. 35). Upon naming and submitting the file, web content server 204 can immediately and automatically transcode (714) the video file into the appropriate file format(s) and store the newly transcoded video file on web content server 210 and/or the television content server 216. Once the files have been transcoded and saved on web content server 210, the user can be notified that the video file has been uploaded successfully (see FIG. 36). Thereafter, the video can be submitted for automated screening (716), manual review (718), authorization (720), selection (722), and time slot assignment (724), as similarly described above with reference to FIG. 16.

No particular computer architecture is intended to be implied by this example. The example is intended to be representative generally of computing systems suitable for being programmed to perform these processes, and not limiting. Execution of a process need not be limited to a single computing system, but could be distributed among more than one computing system. Programs running on a computing system or on multiple computing systems execute parts of the process described in the flow diagrams of FIGS. 2A, 2B, 3, 4 and 5. Multiple instances of a process may execute on the same or on multiple different computing systems. Instances of each of the servers 22, 24, 26 and 28 could run on the same computer, or on different virtual machines on the same computer.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A method performed by data processing apparatus, the method comprising:
    receiving video data from a client computing device at a server system, wherein the video data is captured using a camera connected to the client computing device in accordance with instructions executed on the client computing device, wherein the instructions are provided to the client computing device by the server system and cause the video data to be captured in accordance with predetermined constraints and the predetermined constraints include a frame rate defined by the instructions;
    automatically transcoding the video data, using a server included in the server system, into at least one different format based on at least one of user credentials associated with a user of the client computing device or attributes associated with the video data, wherein at least one format of the transcoded video data defines a video file in a format appropriate for inclusion in a linear television programming broadcast; and
    uploading the transcoded video data to a distribution server for distribution.

2. The method of claim 1 wherein the instructions executed on the client computing device include scripts received by the client computing device from a web application, wherein the scripts are adapted to cause the video data to be captured in accordance with the predetermined constraints.

3. The method of claim 1 wherein the instructions executed on the client computing device are executed within at least one of a browser or a browser plugin on the client computing device.

4. The method of claim 1 wherein the instructions executed on the client computing device are included in an application installed on the client computing device.

5. The method of claim 1 wherein at least a portion of the video data is buffered on the client computing device using scripts included in the instructions executed on the client computing device based on bandwidth constraints for transmitting the video data from the client computing device.

6. The method of claim 1 wherein the video data is transmitted by the client computing device in FLV format.

7. The method of claim 1 wherein the video data is transmitted by the client computing device in a native media container format for the client computing device.

8. The method of claim 1 wherein the predetermined constraints include a bit rate and an image resolution sufficient to enable transcoding of the video data into the format appropriate for inclusion in the linear television programming broadcast.

9. The method of claim 1 wherein transcoding the video data includes using a predetermined automated transcoding workflow corresponding to the predetermined constraints to transcode the video data into the transcoded video data.

10. The method of claim 1 wherein transcoding the video data includes transcoding the video data into a plurality of different video file formats.

11. The method of claim 1 further comprising performing an automated review of at least one of the video data or the transcoded video data to identify potentially inappropriate content.

12. The method of claim 11 further comprising:
    retrieving the transcoded video data for manual review; and
    presenting a review interface adapted to:
        provide an indication of at least one frame within the transcoded video file including content identified as potentially inappropriate content; and
        allow an administrator to select the transcoded video file for manual review.

13. The method of claim 1 further comprising:
    retrieving the transcoded video data for manual review;
    presenting a review interface adapted to allow an administrator to select among a plurality of transcoded video files for manual review;
    receiving a selection of a particular transcoded video file for review through the review interface;
    presenting video defined by the particular transcoded video file through the review interface in response to the selection; and receiving a selection of the particular transcoded video file for publication through the review interface, wherein uploading the transcoded video data to a distribution server is performed in response to the selection of the particular transcoded video file for publication.

14. The method of claim 1 wherein the video data is received in response to a request to submit content for potential inclusion in a linear television programming broadcast.

15. The method of claim 1 wherein automatically transcoding the video data includes transcoding the video data into at least one format appropriate for Internet distribution, the method further comprising storing the transcoded video data in the at least one format appropriate for Internet distribution on a web server adapted to allow retrieval through a web page.

16. The method of claim 15 further comprising distributing the transcoded video data to a plurality of social networking web sites.

17. A non-transitory computer storage medium encoded with a computer program, the program comprising instructions that when executed by data processing apparatus cause the data processing apparatus to perform operations comprising:
displaying, on a client computing device, a user interface adapted to allow a user to selectively record content including high definition video content through a digital camera communicably coupled to the client computing device, wherein the user interface is provided in accordance with instructions received from a server system and the instructions cause the content to be captured in accordance with predetermined constraints that include a frame rate defined by the instructions;
receiving a user selection to record content;
capturing high definition video data using the digital camera during a continuous recording segment;
formatting the high definition video data in accordance with the predetermined constraints; and
transmitting at least a portion of the formatted high definition video data to a storage server of the server system during the continuous recording segment.

18. The computer storage medium of claim 17 wherein the operations are performed using scripts transmitted to the client computing device in a web page and executed on the client device using at least one of a web browser or a web browser plugin.

19. The computer storage medium of claim 17 wherein the predetermined constraints are adapted to enable a transcoding server to perform automated transcoding of the high definition video data into a plurality of video file formats.

20. The computer storage medium of claim 17, the operations further comprising caching a portion of the high definition video data on the client computing device for transmission in accordance with bandwidth limitations on transmitting the formatted high definition video data.

21. The computer storage medium of claim 17, the operations further comprising associating one or more attributes with the formatted high definition video data, the one or more attributes associated with at least one of a request for submissions of content to be included in a television broadcast or a user credential.

22. A non-transitory computer storage medium encoded with a computer program, the program comprising instructions that when executed by data processing apparatus cause the data processing apparatus to perform operations comprising:
displaying, on a client computing device, a user interface adapted to allow a user to selectively record content including high definition video content through a digital camera communicably coupled to the client computing device, wherein the user interface is provided in accordance with instructions received from a server system and the instructions cause the content to be captured in accordance with predetermined constraints that include a frame rate defined by the instructions;
receiving a user selection to record content;
capturing high definition video data using the digital camera during a continuous recording segment;
formatting the high definition video data in accordance with the predetermined constraints;
establishing a connection with a content submission server in response to a user selection to upload the high definition video data; and
transmitting the formatted high definition video data to a storage server of the server system using the connection in response to the user selection, wherein the predetermined constraints are adapted to facilitate transcoding of the formatted high definition video data into a format appropriate for inclusion in a linear television programming broadcast.

23. The computer storage medium of claim 22 wherein formatting the high definition video data includes formatting the high definition video data in a native media container format for the client computing device.

24. The computer storage medium of claim 22 wherein the operations are performed using instructions transmitted to the client computing device downloaded from a web server and installed on the client device, and capturing high definition video data using the digital camera includes interfacing with native device recording capabilities.

25. The computer storage medium of claim 22, the operations further comprising associating one or more attributes with the formatted high definition video data, the one or more attributes associated with at least one of a request for submissions of content to be included in a television broadcast or a user credential.

26. A system comprising:
a user device; and
one or more servers operable to interact with the user device and to:
provide instructions for use by the user device for capturing video data in accordance with predetermined constraints, wherein the predetermined constraints include a frame rate defined by the instructions;
receive video data in a predetermined format from the user device, wherein the video data is captured using the instructions;
transcode the video data into one or more video formats that differ from the predetermined format using an automated transcoding workflow corresponding to the predetermined format;
store the transcoded video data; and
distribute the transcoded video data for inclusion in a linear television programming broadcast.

27. The system of claim 26 wherein the one or more servers are further adapted to provide instructions for execution on the user device in a web page, wherein the instructions are adapted to cause the user device to capture the video data using a camera connected to the user device and to transmit at least a portion of the video data to a web server of the one or more servers as the video data is captured.

28. The system of claim 26 wherein the one or more servers are further adapted to transcode the video data into a format appropriate for inclusion in a linear television programming transmission.

29. The system of claim 26 wherein the one or more servers are further adapted to:
- retrieve the transcoded video data for manual review; and
- present a review interface adapted to:
    - provide an indication of at least one frame within the transcoded video file including content identified as potentially inappropriate content; and
    - allow an administrator to select the transcoded video file for manual review.

30. The system of claim 26 wherein the one or more servers are further adapted to:
- retrieve the transcoded video data for manual review;
- present a review interface adapted to allow an administrator to select among a plurality of transcoded video files for manual review;
- receive a selection of a particular transcoded video file for review through the review interface;
- present video defined by the particular transcoded video file through the review interface in response to the selection; and
- receive a selection of the particular transcoded video file for inclusion in the television broadcast, wherein the transcoded video data is distributed for inclusion in a television broadcast in response to the selection of the particular transcoded video file for inclusion in the television broadcast.

\* \* \* \* \*